(12) United States Patent
Yokogi et al.

(10) Patent No.: US 8,481,625 B2
(45) Date of Patent: *Jul. 9, 2013

(54) POLYCARBONATE RESIN COMPOSITION, AND MOLDED OBJECT, FILM, PLATE, AND INJECTION-MOLDED ARTICLE OBTAINED BY MOLDING THE SAME

(75) Inventors: Masashi Yokogi, Kitakyushu (JP); Michiaki Fuji, Yokkaichi (JP); Haruo Sasaki, Kitakyushu (JP); Kazuya Tanaka, Nagahama (JP); Kouichirou Taniguchi, Nagahama (JP)

(73) Assignees: Mitsubishi Chemical Corporation, Tokyo (JP); Mitsubishi Plastics, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,983

(22) Filed: Jun. 6, 2012

(65) Prior Publication Data

US 2012/0245266 A1 Sep. 27, 2012

Related U.S. Application Data

(63) Continuation of application No. PCT/JP2010/072282, filed on Dec. 10, 2010.

(30) Foreign Application Priority Data

| Dec. 10, 2009 | (JP) | 2009-280865 |
| Dec. 18, 2009 | (JP) | 2009-288107 |
| Aug. 20, 2010 | (JP) | 2010-185058 |

(51) Int. Cl.
*C08L 69/00* (2006.01)
*C08K 5/17* (2006.01)

(52) U.S. Cl.
USPC ............ 524/186; 524/537; 525/462

(58) Field of Classification Search
USPC .................. 524/186, 537; 525/462
See application file for complete search history.

(56) References Cited

U.S. PATENT DOCUMENTS

| 7,297,735 B2 | 11/2007 | Pearson et al. |
| 2004/0192813 A1 | 9/2004 | Pearson et al. |
| 2005/0272903 A1 * | 12/2005 | Mitsunaga et al. ........... 528/196 |
| 2010/0190953 A1 | 7/2010 | Fuji et al. |

FOREIGN PATENT DOCUMENTS

| EP | 0 111 810 | 6/1984 |
| EP | 0837086 * | 4/1998 |
| JP | 58-018391 | 2/1983 |
| JP | 59-120648 | 7/1984 |
| JP | 10-087973 | 4/1998 |
| JP | 10-101918 | 4/1998 |
| JP | 2006-028441 | 2/2006 |
| JP | 2006-519916 | 8/2006 |
| JP | 2006-519917 | 8/2006 |
| JP | 2006-232897 | 9/2006 |
| JP | 2007-070391 | 3/2007 |
| JP | 2008-024919 | 2/2008 |
| JP | 2008-274007 | 11/2008 |
| JP | 2009-091404 | 4/2009 |
| JP | 2009-091417 | 4/2009 |
| JP | 2009-144013 | 7/2009 |
| JP | 2009-144014 | 7/2009 |
| WO | WO 2004/111106 | 12/2004 |

OTHER PUBLICATIONS

International Search Report issued Feb. 1, 2011 in PCT/JP2010/072282 filed Dec. 10, 2010.
Seichii Honma; "Porikaboneto Jushi Handobukku"; The Nikkan Kogyo Shinbun, Ltd., 1992.
U.S. Appl. No. 13/601,298, filed Aug. 31, 2012, Yokogi, et al.
U.S. Appl. No. 13/618,368, filed Sep. 14, 2012, Sasaki.
U.S. Appl. No. 13/680,696, filed Nov. 19, 2012, Yokogi, et al.
U.S. Appl. No. 13/727,361, filed Dec. 26, 2012, Yokogi, et al.
U.S. Appl. No. 13/477,271, filed May 22, 2012, Sasaki.
U.S. Appl. No. 13/483,687, filed May 30, 2012, Sasaki.
U.S. Appl. No. 13/483,568, filed May 30, 2012, Sasaki.
U.S. Appl. No. 13/488,993, filed Jun. 5, 2012, Sasaki.

* cited by examiner

*Primary Examiner* — John Uselding
(74) *Attorney, Agent, or Firm* — Oblon, Spivak, McClelland, Maier & Neustadt, L.L.P.

(57) ABSTRACT

The present invention relates to a polycarbonate resin composition (X) which includes a polycarbonate resin (A) and an aromatic polycarbonate resin (B), the polycarbonate resin (A) including a constitutional unit derived from a dihydroxy compound (a) having, as part of the structure thereof, a site represented by the following formula (1) and a constitutional unit derived from a dihydroxy compound (b) of an aliphatic hydrocarbon, wherein the proportion of the constitutional unit derived from the dihydroxy compound (b) of an aliphatic hydrocarbon based on all constitutional units each derived from a dihydroxy compound in the polycarbonate resin (A) is 45% by mole or more.

[Chem. 1]

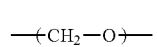

(1)

(The case where the site represented by the formula (1) is part of —CH$_2$—O—H is omitted.)

21 Claims, No Drawings

POLYCARBONATE RESIN COMPOSITION, AND MOLDED OBJECT, FILM, PLATE, AND INJECTION-MOLDED ARTICLE OBTAINED BY MOLDING THE SAME

TECHNICAL FIELD

The present invention relates to a polycarbonate resin composition excellent in weather resistance, transparency, hue, heat resistance, thermal stability, moldability, and mechanical strength, and to a molded object, a film, a plate, and an injection-molded article each obtained therefrom.

BACKGROUND ART

Poly(vinyl chloride) resins, which are known as resins having a satisfactory balance among various properties including transparency and mechanical properties, have conventionally been used in various applications because the glass transition temperatures thereof can be regulated in a wide range according to applications by means of a plasticizer and various compounding ingredients. In recent years, however, replacement of poly(vinyl chloride) resins with other resins is being investigated enthusiastically from the standpoints of environmental issues, etc. Among promising resins expected to be usable as substitutes for poly(vinyl chloride) resins are polycarbonate resins, which are excellent in transparency, heat resistance, and impact resistance. Polycarbonate resins are being utilized in various applications.

Polycarbonate resins are generally produced using bisphenols as a monomer ingredient, and are being extensively utilized as so-called engineering plastics in the fields of electrical/electronic parts, automotive parts, medical parts, building materials, films, sheets, bottles, optical recording media, lenses, etc. so as to take advantage of the superiority thereof such as transparency, heat resistance, and mechanical strength.

However, the conventional polycarbonate resins deteriorate in hue, transparency, and mechanical strength when used over a long period in places where the resins are exposed to ultraviolet rays or visible light. There hence have been limitations on outdoor use thereof and on use thereof in the vicinity of illuminators.

Furthermore, use of the conventional polycarbonate resins as various molded articles has encountered a problem that the polycarbonate resins show poor mold release characteristics during melt molding and it is difficult to use the resins as transparent materials, optical materials, or the like. Polycarbonate resins have a high melt viscosity and low flowability and, hence, have had a drawback that the resins have poor moldability when sheets, films, molded articles, and the like are molded therefrom. Especially with respect to use in optical applications, polycarbonate resins are currently usable only in limited applications because polycarbonate resins have a high photoelastic coefficient and are apt to cause a phase difference upon stress imposition thereon.

Techniques in which a benzophenone-based ultraviolet absorber, benzotriazole-based ultraviolet absorber, or benzoxazine-based ultraviolet absorber is added to a polycarbonate resin in order to overcome such problems are widely known (for example, non-patent document 1).

It is also widely known that addition of a hindered amine-based light stabilizer (HALS) to a polycarbonate resin is impracticable because polycarbonate resins are unstable to basic ingredients, e.g., alkalis, even at ordinary temperature and are hydrolyzed also by HALSs.

The bisphenol compounds for use in producing conventional polycarbonate resins have a benzene ring structure and hence show high absorption of ultraviolet rays. This leads to a deterioration in the light resistance of the polycarbonate resins. Consequently, use of monomer units derived from an aliphatic dihydroxy compound or alicyclic dihydroxy compound which has no benzene ring structure in the molecular framework or from a cyclic dihydroxy compound having an ether bond in the molecule, such as isosorbide, is expected to theoretically improve light resistance. In particular, polycarbonate resins produced using, as a monomer, isosorbide obtained from biomass resources have excellent heat resistance and mechanical strength, and many investigations thereon hence have come to be made in recent years (for example, patent documents 1 to 7).

It is also widely known that benzotriazole, benzophenone, and cyanoacrylate compounds and the like are added as ultraviolet absorbers to polycarbonate resin compositions obtained using monomers having an ether bond in the molecule, such as isosorbide, isomannide, and isoidide, which each have no benzene ring structure in the molecular framework (for example, patent document 8).

Many resin compositions of a polycarbonate resin with a polyester resin have hitherto been proposed in order to improve the moldability of polycarbonate resins. For example, patent document 9 discloses a resin composition obtained by mixing a polycarbonate resin with a polyester resin such as poly(butylene terephthalate) or poly(ethylene terephthalate), and patent document 10 discloses a resin composition which has improved flowability imparted thereto by controlling the degree of transesterification of a polycarbonate resin with a polyester resin and which is excellent in transparency, solvent resistance, and impact resistance. Furthermore, patent document 11 and patent document 12 disclose resin compositions each constituted of a polycarbonate resin and an amorphous polyester resin.

PRIOR-ART DOCUMENTS

Patent Documents

Patent Document 1: International Publication No. 04/111106
Patent Document 2: JP-A-2006-232897
Patent Document 3: JP-A-2006-28441
Patent Document 4: JP-A-2008-24919
Patent Document 5: JP-A-2009-91404
Patent Document 6: JP-A-2009-91417
Patent Document 7: JP-A-2008-274007
Patent Document 8: JP-A-2007-70391
Patent Document 9: JP-A-58-18391
Patent Document 10: JP-A-10-87973
Patent Document 11: JP-A-59-120648
Patent Document 12: JP-A-10-101918

Non-Patent Document

Non-Patent Document 1: Porikābonē to Jushi Handobukku (Aug. 28, 1992, published by The Nikkan Kogyo Shinbun, Ltd., edited by HONMA Seiichi)

SUMMARY OF THE INVENTION

Problems that the Invention is to Solve

However, addition of ultraviolet absorbers such as those described in non-patent document 1 poses the following problems although the addition brings about improvements in hue retention through ultraviolet irradiation, etc. Namely, there have been problems, for example, that the addition of the ultraviolet absorbers deteriorates the hue, heat resistance, and transparency which are inherent in the resin and that the ultraviolet absorbers volatilize during molding to foul the mold.

Furthermore, with respect to the techniques described in patent documents 1 to 7, since aliphatic dihydroxy compounds, alicyclic dihydroxy compounds, and cyclic dihydroxy compounds having an ether bond in the molecule, such as isosorbide, have no phenolic hydroxyl group, it is difficult to polymerize these compounds by the interfacial process which is widely known as a process for polycarbonate resin production using bisphenol A as a starting material. Usually, polycarbonate resins are produced from those compounds by the process which is called a transesterification process or a melt process. In this process, any of those dihydroxy compounds and a carbonic diester, e.g., diphenyl carbonate, are subjected to transesterification at a high temperature of 200° C. or above in the presence of a basic catalyst, and the by-product, e.g., phenol, is removed from the system to allow the polymerization to proceed, thereby obtaining a polycarbonate resin. However, the polycarbonate resins obtained using monomers having no phenolic hydroxyl group, such as those shown above, have poor thermal stability as compared with polycarbonate resins obtained using monomers having phenolic hydroxyl groups, e.g., bisphenol A, and hence have had the following problem. The polycarbonate resins take a color during the polymerization or molding in which the resins are exposed to high temperatures and, as a result, the polycarbonate resins come to absorb ultraviolet rays and visible light and hence have impaired light resistance. Especially when a monomer having an ether bond in the molecule, such as isosorbide, was used, the polycarbonate resin considerably deteriorates in hue. A significant improvement has been desired. Furthermore, when such polycarbonate resins are to be used as various molded articles, the resins are melt-molded at high temperatures. For this application also, there has been a desire for a material having satisfactory thermal stability and excellent moldability and mold release characteristics. In particular, the polycarbonate disclosed in patent document 1 has low impact resistance and is not compatible with aromatic polycarbonates, although the polycarbonate itself is excellent in transparency and flowability. This polycarbonate hence has had a problem that a considerable decrease in transparency occurs when the polycarbonate is melt-mixed with an aromatic polycarbonate.

Moreover, addition of an ultraviolet absorber such as that described in patent document 8 has encountered a problem that the addition of the ultraviolet absorber deteriorates the hue, heat resistance, and transparency in a weatherability test which are inherent in the resin.

Furthermore, secondary products obtained by processing conventional resin compositions such as the composition disclosed in patent document 9 have been still insufficient in transparency. This is thought to be because the transesterification reaction between the polycarbonate resin and the polyester resin has not proceeded sufficiently. The resin composition disclosed in patent document 10 has had problems, for example, that the transesterification reaction is difficult to control and that it is necessary to use a polycarbonate resin having a functional group at an end.

The resin compositions disclosed in patent document 11 and patent document 12 have had a problem that the compositions undesirably have a further increased photoelastic coefficient because of the amorphous polyester resin incorporated thereinto, although excellent in transparency, heat resistance, and impact resistance.

An object of the invention is to eliminate the problems of prior-art techniques described above and to provide a polycarbonate resin composition excellent in weather resistance, transparency, hue, heat resistance, thermal stability, moldability, and mechanical strength and molded articles obtained therefrom.

Means for Solving the Problems

The present inventors diligently made investigations in order to overcome those problems. As a result, the inventors have found that the following polycarbonate resin composition not only has excellent light resistance but also is excellent in transparency, hue, heat resistance, thermal stability, moldability, and mechanical strength. The invention has been thus achieved.

Essential points of the invention reside in the following [1] to [20].

[1]

A polycarbonate resin composition (X) which comprises a polycarbonate resin (A) and an aromatic polycarbonate resin (B), the polycarbonate resin (A) comprising a constitutional unit derived from a dihydroxy compound (a) having, as part of the structure thereof, a site represented by the following formula (1) and a constitutional unit derived from a dihydroxy compound (b) of an aliphatic hydrocarbon, wherein the proportion of the constitutional unit derived from the dihydroxy compound (b) of an aliphatic hydrocarbon based on all constitutional units each derived from a dihydroxy compound in the polycarbonate resin (A) is 45% by mole or more.

[Chem. 1]

(1)

(The case where the site represented by the formula (1) is part of —CH$_2$—O—H is omitted.)

[2]

The polycarbonate resin composition according to [1] wherein a molded object having a thickness of 3 mm formed from the polycarbonate resin composition has a total light transmittance of 85% or higher after having undergone a 500-hour irradiation treatment with a sunshine carbon arc lamp at a discharge voltage of 50 V and a discharge current of 60 A at a black panel temperature of 63° C. in an environment having a relative humidity of 50% and a rainfall spray period per hour of 12 minutes, and the molded object has a difference in yellowness index (YI) value between before and after the irradiation treatment of 10 or less.

[3]

The polycarbonate resin composition according to [1] or [2] wherein the polycarbonate resin composition (X) has a single glass transition temperature and the glass transition temperature is not lower than the glass transition temperature of the polycarbonate resin (A) and not higher than the glass transition temperature of the aromatic polycarbonate resin (B).

[4]

The polycarbonate resin composition according to any one of [1] to [3] wherein the glass transition temperature of the polycarbonate resin (A) is 75-105° C.

[5]
The polycarbonate resin composition according to any one of [1] to [4] wherein the glass transition temperature of the polycarbonate resin composition (X) is 75-130° C.

[6]
The polycarbonate resin composition according to any one of [1] to [5] which gives an injection-molded article that has a total light transmittance, as measured in accordance with JIS K7105 (1981) using a hazemeter and illuminant D65, of 60% or higher.

[7]
The polycarbonate resin composition according to any one of [1] to [6] which, when having a thickness of 1 mm, has a total light transmittance as measured in accordance with JIS K7361-1 (1997) of 80% or higher and a haze as measured in accordance with JIS K7105 (1981) of 5% or less.

[8]
The polycarbonate resin composition according to any one of [1] to [7] which has a notched Charpy impact strength as measured in accordance with ISO 179 (2000) of 10 kJ/m² or higher.

[9]
The polycarbonate resin composition according to any one of [1] to [8] wherein the proportion of the constitutional unit derived from the dihydroxy compound (b) of an aliphatic hydrocarbon based on all constitutional units each derived from a dihydroxy compound in the polycarbonate resin (A) is 45-80% by mole, and
the content of the polycarbonate resin (A) in the polycarbonate resin composition (X) is 1-99% by mass.

[10]
The polycarbonate resin composition according to any one of [1] to [9] wherein the dihydroxy compound (a) is a dihydroxy compound represented by the following formula (2).

[Chem. 2]

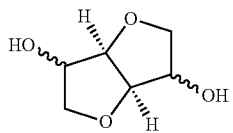

(2)

[11]
The polycarbonate resin composition according to any one of [1] to [10] which further contains an ultraviolet absorber in an amount of 0.0001-1 part by weight per 100 parts by weight of the mixture of the polycarbonate resin (A) and the aromatic polycarbonate resin (B).

[12]
The polycarbonate resin composition according to any one of [1] to [11] which further contains a hindered amine-based light stabilizer in an amount of 0.001-1 part by weight per 100 parts by weight of the mixture of the polycarbonate resin (A) and the aromatic polycarbonate resin (B).

[13]
The polycarbonate resin composition according to any one of [1] to [12] which further contains an antioxidant in an amount of 0.0001-1 part by weight per 100 parts by weight of the mixture of the polycarbonate resin (A) and the aromatic polycarbonate resin (B).

[14]
The polycarbonate resin composition according to any one of [1] to [13] which further contains a release agent in an amount of 0.0001-2 parts by weight per 100 parts by weight of the mixture of the polycarbonate resin (A) and the aromatic polycarbonate resin (B).

[15]
A polycarbonate resin molded object obtained by molding the polycarbonate resin composition according to any one of [1] to [14].

[16]
The molded object according to [15] which has a photoelastic coefficient as measured with light having a wavelength of 600 nm of $7 \times 10^{-11}$ $Pa^{-1}$ or less.

[17]
A film obtained by molding the polycarbonate resin composition according to any one of [1] to [14].

[18]
The film according to [17] which, when having been molded in a thickness of 0.2 mm, has a total light transmittance as measured in accordance with JIS K7361-1 (1997) of 80% or higher and a haze as measured in accordance with JIS K7105 (1981) of 3% or less.

[19]
A plate obtained by molding the polycarbonate resin composition according to any one of [1] to [14].

[20]
An injection-molded article obtained by injection-molding the polycarbonate resin composition according to any one of [1] to [14].

Effects of the Invention

According to the invention, a polycarbonate resin composition excellent in weather resistance, transparency, hue, heat resistance, thermal stability, moldability, and mechanical strength and molded articles thereof can be provided.

MODES FOR CARRYING OUT THE INVENTION

Modes for carrying out the invention will be explained below in detail. The following explanations on constituent elements are for embodiments (representative embodiments) of the invention, and the invention should not be construed as being limited to the embodiments unless the invention departs from the sprit thereof.

In this description, "% by mass", "mass ppm", and "parts by mass" have the same meanings as "% by weight", "weight ppm", and "parts by weight", respectively. Furthermore, the mere expression "ppm" means "weight ppm".

<Polycarbonate Resin (A)>

The polycarbonate resin (A) to be used in the invention is not particularly limited in processes for producing the resin. Usually, however, the polycarbonate resin (A) is obtained using dihydroxy compounds comprising a dihydroxy compound (a) having, as part of the structure thereof, the site represented by the following formula (1) and a dihydroxy compound (b) of an aliphatic hydrocarbon and a carbonic diester as starting materials, by condensation-polymerizing the starting materials by means of a transesterification reaction. Namely, the polycarbonate resin (A) to be used in the invention contains a constitutional unit derived from a dihydroxy compound (a) having the site represented by the following formula (1) and a constitutional unit derived from a dihydroxy compound (b) of an aliphatic hydrocarbon. However, the case where the site represented by the formula (1) is part of —CH₂—O—H is omitted.

[Chem. 3]

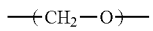

(1)

The polycarbonate resin composition of the invention comprises a polycarbonate resin (A) which at least contains a constitutional unit derived from a dihydroxy compound having the site represented by the formula (1) and a constitutional unit derived from a dihydroxy compound (b) of an aliphatic hydrocarbon, and this polycarbonate resin (A) may be a polycarbonate copolymer which further contains constitutional units derived from other dihydroxy compounds besides constitutional units derived from those dihydroxy compounds. In the invention, one polycarbonate resin (A) may be used alone, or two or more polycarbonate resins (A) may be used as a mixture thereof.

When part of the constitutional units derived from other dihydroxy compounds have been replaced with constitutional units derived from an aromatic dihydroxy compound, then this polycarbonate resin (A) may be regarded as the aromatic polycarbonate resin (B), which will be described later. In the invention, however, there are no cases where one polycarbonate serves as both a polycarbonate resin (A) and a polycarbonate resin (B). If a polycarbonate resin (A) has constitutional units derived from an aromatic dihydroxy compound, this polycarbonate resin composition of the invention comprises that polycarbonate resin (A) and at least one polycarbonate selected from another kind of polycarbonate resin (A) and an aromatic polycarbonate resin (B).

(Dihydroxy Compounds)

The dihydroxy compounds to be used for the polycarbonate resin (A) according to the invention are not particularly limited so long as the compounds comprise a dihydroxy compound (a) having, as part of the structure thereof, the site represented by the formula (1) and a dihydroxy compound (b) of an aliphatic hydrocarbon.

Examples of the dihydroxy compound (a) having, as part of the structure thereof, the site represented by the formula (1) include oxyalkylene glycols such as diethylene glycol, triethylene glycol, and tetraethylene glycol, compounds which have an aromatic group as a side chain and have, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene, dihydroxy compounds represented by the following formula (2), and compounds having a cyclic ether structure, such as spiro glycols represented by the following formula (3). Of these, oxyalkylene glycols such as diethylene glycol and triethylene glycol and compounds having a cyclic ether structure are preferred from the standpoints of availability, handling, reactivity during polymerization, and the hue of the polycarbonate resin (A) to be obtained. Preferred from the standpoint of heat resistance are anhydrous sugar alcohols represented by dihydroxy compounds represented by the following formula (2) and compounds having a cyclic ether structure which are represented by the following formula (3).

These compounds may be used alone or in combination of two or more thereof according to the performances required of the polycarbonate resin (A) to be obtained.

[Chem. 4]

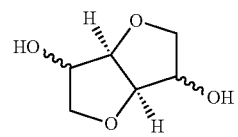

(2)

[Chem. 5]

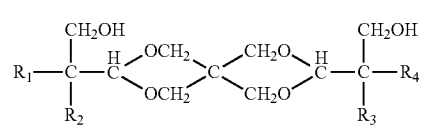

(3)

(In the formula (3), $R_1$ to $R_4$ each independently are an alkyl group having 1-3 carbon atoms, and preferably are methyl.)

Examples of the dihydroxy compounds represented by the formula (2) include isosorbide, isomannide, and isoidide, which are stereoisomers. These compounds may be used alone or in combination of two or more thereof.

From the standpoint of the light resistance of the polycarbonate resin (A), it is preferred to use dihydroxy compounds having no aromatic ring structure among those dihydroxy compounds. Most preferred of these dihydroxy compounds is isosorbide from the standpoints of availability, ease of production, light resistance, optical properties, moldability, heat resistance, and carbon neutrality. Isosorbide is obtained by the dehydrating condensation of sorbitol, which is produced from various starches that are plant-derived abundant resources and are easily available.

The dihydroxy compound (b) of an aliphatic hydrocarbon is a compound which has an aliphatic hydrocarbon framework and two hydroxy groups, and the aliphatic hydrocarbon framework may have a branch or have a cyclic structure, so long as the framework is a hydrocarbon framework having no unsaturated bond. In the case where the dihydroxy compound is a compound having a hydrocarbon framework of a cyclic structure and having two hydroxy groups, each hydroxy group may have been directly bonded to the cyclic structure or may have been bonded to the cyclic structure through a saturated hydrocarbon group. The cyclic structure may be monocyclic or polycyclic.

More specifically, examples thereof include dihydroxy compounds of linear aliphatic hydrocarbons, such as ethylene glycol, 1,3-propanediol, 1,4-butanediol, 1,5-heptanediol, and 1,6-hexanediol, dihydroxy compounds of linear branched aliphatic hydrocarbons, such as neopentyl glycol and hexylene glycol, and dihydroxy compounds of alicyclic hydrocarbons, such as 1,2-cyclohexanediol and 1,4-cyclohexanedimethanol. Examples of the dihydroxy compounds of alicyclic hydrocarbons include cyclohexanediols such as 1,2-cyclohexanediol, 1,3-cyclohexanediol, 1,4-cyclohexanediol, and 2-methyl-1,4-cyclohexanediol, cyclohexenediols such as 4-cyclohexene-1,2-diol, cyclohexanedimethanols such as 1,2-cyclohexanedimethanol, 1,3-cyclohexanedimethanol, and 1,4-cyclohexanedimethanol, cyclohexenedimethanols such as 4-cyclohexene-1,2-dimethanol, norbornanedimethanols such as 2,3-norbornanedimethanol and 2,5-norbornanedimethanol, tricyclodecanedimethanol, pentacyclopentadecanedimethanol, 1,3-adamantanediol, and 2,2- adamantanediol. Preferred of these are the dihydroxy compounds of alicyclic hydrocarbons. More preferred are the dihydroxy compounds each having cyclohexane in the structure thereof. Especially preferred are 1,2-cyclohexanedimethanol, 1,3-cyclohexanedimethanol, and 1,4-cyclohexanedimethanol.

Because a constitutional unit derived from a dihydroxy compound (a) having, as part of the structure thereof, the site represented by the formula (1) and a constitutional unit derived from a dihydroxy compound (b) of an aliphatic hydrocarbon are contained, it is possible to obtain effects such as improving the flexibility of the polycarbonate resin (A), improving the heat resistance thereof, and improving the moldability thereof.

Furthermore, when the proportion of the constitutional unit derived from the dihydroxy compound (b) of an aliphatic hydrocarbon in the polycarbonate resin (A) is not less than a given amount, it is possible to obtain a polycarbonate resin composition excellent in weather resistance, hue, and mechanical strength. The lower limit of the proportion of the constitutional unit derived from the dihydroxy compound (b) of an aliphatic hydrocarbon based on all constitutional units each derived from a dihydroxy compound in the polycarbonate resin (A) is 45% by mole or more, generally 50% by mole or more, preferably 52% by mole or more, more preferably 55% by mole or more, especially preferably 60% by mole or more. By regulating the proportion thereof to 45% by mole or more, satisfactory compatibility with the aromatic polycarbonate resin (B) is imparted and the transparency and mechanical properties of the polycarbonate resin composition (X) and molded objects are sufficiently improved. In addition, a reduction in photoelastic coefficient can be attained. On the other hand, the upper limit thereof is preferably 90% by mole or less, more preferably 80% by mole or less, even more preferably 75% by mole or less, especially preferably 70% by mole or less. By regulating the upper limit thereof so as to be within that range, the considerable decrease in heat resistance and increase in flexibility which are attributable to the polycarbonate resin (A) can be prevented and the polycarbonate resin composition is rendered usable in a wide range of applications.

So long as the polycarbonate resin (A) to be used in the invention contains a constitutional unit derived from a dihydroxy compound (a) having, as part of the structure thereof, the site represented by the formula (1) and further contains a constitutional unit derived from a dihydroxy compound (b) of an aliphatic hydrocarbon, the polycarbonate resin (A) may contain constitutional units derived from dihydroxy compounds other than those dihydroxy compounds. By using such other dihydroxy compounds, it is possible to obtain effects such as improving the flexibility of the polycarbonate resin (A) and improving the moldability thereof. However, in the case where the content of constitutional units derived from other dihydroxy compounds is too high, this may result in a decrease in mechanical property and a decrease in heat resistance.

In the case where such other dihydroxy compounds are used, the amount of the constitutional units derived from such other dihydroxy compounds based on all constitutional units each derived from a dihydroxy compound is preferably 40% by mole or less, more preferably 30% by mole or less, even more preferably 20% by mole or less, especially preferably 10% by mole or less. However, in the case where such other dihydroxy compounds have an aromatic ring, the polycarbonate resin (A) to be used is a polycarbonate resin which differs in structure from the aromatic polycarbonate resin (B).

Examples of the other dihydroxy compounds include aromatic bisphenol compounds such as 2,2-bis(4-hydroxyphenyl)propane[=bisphenol A], 2,2-bis(4-hydroxy-3,5-dimethylphenyl)propane, 2,2-bis(4-hydroxy-3,5-diethylphenyl) propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, 9,9-bis (4-(2-hydroxyethoxy-2-methyl)phenyl)fluorene, 9,9-bis(4-hydroxyphenyl)fluorene, and 9,9-bis(4-hydroxy-2-methylphenyl)fluorene. However, from the standpoint of the light resistance of the polycarbonate resin composition (X), it is preferred that the polycarbonate resin (A) should have no aromatic ring structure in the molecular structure.

Examples of the other dihydroxy compounds further include the aliphatic dihydroxy compounds shown in International Publication No. 2004/111106 and the alicyclic dihydroxy compounds shown in International Publication No. 2007/148604.

It is preferred that constitutional units derived from at least one compound selected from the group consisting of ethylene glycol, 1,3-propanediol, 1,4-butanediol, 1,5-pentanediol, and 1,6-hexanediol, among constitutional units derived from the aliphatic dihydroxy compounds shown above, should be contained.

Preferred of constitutional units derived from the alicyclic dihydroxy compounds shown above are constitutional units comprising a 5-membered cyclic structure or a 6-membered cyclic structure. The 6-membered cyclic structure may be in a chair form or boat form which has been fixed by means of covalent bonds. By introducing constitutional units derived from an alicyclic dihydroxy compound having a 5-membered cyclic structure or 6-membered cyclic structure, a polycarbonate having enhanced heat resistance can be obtained. The number of the carbon atoms contained in the alicyclic dihydroxy compound is generally 70 or less, preferably 50 or less, more preferably 30 or less.

Examples of the alicyclic dihydroxy compound comprising a 5-membered cyclic structure or 6-membered cyclic structure include the alicyclic dihydroxy compounds shown in International Publication No. 2007/148604, which was cited above. Suitable examples thereof include tricyclodecanedimethanol, adamantanediol, and pentacyclopentadecanedimethanol. These may be used alone or in combination of two or more thereof.

The dihydroxy compounds to be used in the invention may contain stabilizers such as a reducing agent, antioxidant, free-oxygen scavenger, light stabilizer, antacid, pH stabilizer, and heat stabilizer. Since the dihydroxy compounds to be used in the invention are apt to alter especially under acidic conditions, it is preferred that the dihydroxy compounds should contain a basic stabilizer. Examples of the basic stabilizer include the hydroxides, carbonates, phosphates, phosphites, hypophosphites, borates, and fatty acid salts of Group-1 or Group-2 metals of the long-form periodic table (Nomenclature of Inorganic Chemistry IUPAC Recommendations 2005). Examples thereof further include basic ammonium compounds such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide and amine compounds such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline. Of these, the phosphates and phosphites of sodium or potassium are preferred from the standpoints of the effect thereof and the ease of removal thereof by distillation which will be described later. Especially preferred are disodium hydrogen phosphate and disodium hydrogen phosphite.

There are no particular limitations on the content of those basic stabilizers in the dihydroxy compounds to be used in the invention. In the case where the content thereof is too low, there is a possibility that the effect of preventing the alteration of the dihydroxy compounds to be used in the invention might not be obtained. When the content thereof is too high, there are the cases where the dihydroxy compounds to be used in the invention are altered. Consequently, the content of those basic stabilizers is generally 0.0001-1% by weight, preferably 0.001-0.1% by weight, based on each dihydroxy compound to be used in the invention.

When the dihydroxy compounds to be used in the invention which contain those basic stabilizers are used as a starting material for producing a polycarbonate resin, not only the basic stabilizers themselves serve as a polymerization catalyst to make it difficult to control polymerization rate and quality, but also the presence of the basic stabilizers leads to a deterioration in initial hue, resulting in molded articles having impaired light resistance. It is therefore preferred that the basic stabilizers should be removed with an ion-exchange resin or by distillation or the like before the dihydroxy compounds are used as a starting material for producing a polycarbonate resin.

In the case where a dihydroxy compound to be used in the invention is a compound having a cyclic ether structure, e.g., isosorbide, this dihydroxy compound is apt to be gradually oxidized by oxygen. It is therefore important to prevent water inclusion during storage or production in order to prevent decomposition caused by oxygen. It is also important to use a free-oxygen scavenger or the like or to handle the dihydroxy compound in a nitrogen atmosphere. There are the cases where isosorbide, upon oxidation, generates decomposition products comprising formic acid. For example, in the case where isosorbide containing those decomposition products is used as a starting material for producing a polycarbonate resin, there is the possibility of resulting in a colored polycarbonate resin. There also is a possibility that the decomposition products considerably deteriorate the properties of the resin. In addition, there are the cases where the decomposition products affect the polymerization reaction to make it impossible to obtain a polymer having a high molecular weight. Use of such isosorbide hence is undesirable.

It is preferred to conduct purification by distillation in order to obtain the dihydroxy compounds to be used in the invention which do not contain the oxidative-decomposition products and to remove the basic stabilizers described above. The distillation in this case may be simple distillation or continuous distillation, and is not particularly limited. With respect to distillation conditions, it is preferred to conduct distillation at a reduced pressure in an inert gas atmosphere such as argon or nitrogen. From the standpoint of inhibiting thermal alteration, it is preferred to conduct the distillation under the conditions of 250° C. or lower, preferably 200° C. or lower, especially 180° C. or lower.

Through such purification by distillation, the content of formic acid in the dihydroxy compounds to be used in the invention is reduced to 20 weight ppm or less, preferably 10 weight ppm or less, especially preferably 5 weight ppm or less. As a result, when dihydroxy compounds comprising these dihydroxy compounds to be used in the invention are used as a starting material for producing a polycarbonate resin, polymerizability is not impaired and a polycarbonate resin (A) having an excellent hue and excellent thermal stability can be produced. The content of formic acid is determined by ion chromatography.

<Carbonic Diester>

The polycarbonate resin (A) to be used in the invention can be obtained using dihydroxy compounds comprising the dihydroxy compounds to be used in the invention described above and a carbonic diester as starting materials, by condensation-polymerizing the starting materials by means of a transesterification reaction.

Examples of the carbonic diester to be used usually include compounds represented by the following formula (4). One of these carbonic diesters may be used alone, or a mixture of two or more thereof may be used.

[Chem. 6]

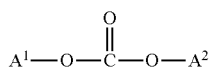

(4)

In the formula (4), $A^1$ and $A^2$ each independently are a substituted or unsubstituted aliphatic group having 1-18 carbon atoms or a substituted or unsubstituted aromatic group. Examples of the carbonic diesters represented by the formula (4) include diphenyl carbonate, substituted diphenyl carbonates, e.g., ditolyl carbonate, dimethyl carbonate, diethyl carbonate, and di-t-butyl carbonate. Preferred are diphenyl carbonate and substituted diphenyl carbonates. Especially preferred is diphenyl carbonate. Incidentally, there are the cases where carbonic diesters contain impurities such as chloride ions and where the impurities inhibit the polymerization reaction and impair the hue of the polycarbonate resin to be obtained. It is therefore preferred that a carbonic diester which has been purified by, for example, distillation should be used according to need.

<Transesterification Reaction Catalyst>

The polycarbonate resin (A) to be used in the invention may be produced by subjecting dihydroxy compounds comprising the dihydroxy compounds to be used in the invention as described above and a carbonic diester represented by the formula (4) to a transesterification reaction. More specifically, the polycarbonate resin is obtained by subjecting the starting materials to transesterification and removing the by-product monohydroxy compound, etc. from the system. In this case, polycondensation is usually conducted by means of a transesterification reaction in the presence of a transesterification reaction catalyst.

The transesterification reaction catalyst (hereinafter often referred to simply as catalyst or polymerization catalyst) which can be used for producing the polycarbonate resin (A) to be used in the invention can affect light transmittance as measured especially at a wavelength of 350 nm and yellowness index value.

The catalyst to be used is not limited so long as the catalyst enables the polycarbonate resin (A) produced therewith to satisfy, in particular, light resistance among light resistance, transparency, hue, heat resistance, thermal stability, and mechanical strength. Examples thereof include compounds of metals belonging to the Group 1 or Group 2 of the long-form periodic table (hereinafter referred to simply as "Group 1" or "Group 2") and basic compounds such as basic boron compounds, basic phosphorus compounds, basic ammonium compounds, and amine compounds. It is preferred to use a Group-1 metal compound and/or a Group-2 metal compound.

It is possible to use a basic compound such as a basic boron compound, basic phosphorus compound, basic ammonium compound, or amine compound as an auxiliary together with a Group-1 metal compound and/or a Group-2 metal compound. It is, however, especially preferred to use a Group-1 metal compound and/or a Group-2 metal compound only.

With respect to the form of the Group-1 metal compound and/or Group-2 metal compound, the compound is used usually in the form of a hydroxide or a salt such as carbonate, carboxylate, or phenolate. However, hydroxides, carbonates, and acetates are preferred from the standpoints of availability and handleability, and acetates are preferred from the standpoints of hue and activity in polymerization.

Examples of the Group-1 metal compound include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, phenylated boron-sodium compounds, phenylated boron-potassium compounds, phenylated boron-lithium compounds, phenylated boron-cesium compounds, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenyl phosphate, dipotassium phenyl phosphate, dilithium phenyl phosphate, dicesium phenyl phosphate, alcoholates or phenolates of sodium, potassium, lithium, and cesium, and the disodium salt, dipotassium salt, dilithium salt, and dicesium salt of bisphenol A. Preferred of these are the lithium compounds.

Examples of the Group-2 metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Preferred of these are the magnesium compounds, the calcium compounds, and the barium compounds. From the standpoints of activity in polymerization and the hue of the polycarbonate resin to be obtained, the magnesium compounds and/or the calcium compounds are more preferred, and the calcium compounds are most preferred.

Examples of the basic boron compounds include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compounds include triethylphosphine, tri-n-propylphosphine, triisopropylphosphine, tri-n-butylphosphine, triphenylphosphine, tributylphosphine, and quaternary phosphonium salts.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst to be used is preferably 0.1-300 μmol, more preferably 0.5-100 μmol, per mole of all dihydroxy compounds subjected to the polymerization. Especially in the case where use is made of one or more compounds containing at least one metal selected from the group consisting of lithium and the Group-2 metals of the long-form periodic table, in particular, in the case where a magnesium compound and/or a calcium compound is used, the amount of this catalyst is preferably 0.1 μmol or more, more preferably 0.5 μmol or more, especially preferably 0.7 μmol or more, in terms of metal amount per mole of all dihydroxy compounds. The suitable upper limit thereof is preferably 20 μmol, more preferably 10 μmol, especially preferably 3 μmol, most preferably 1.5 μmol, in particular 1.0 μm.

In the case where the amount of the catalyst is too small, the rate of polymerization is too low. As a result, a higher polymerization temperature must be used in order to obtain a polycarbonate resin (A) having a desired molecular weight, and the polycarbonate resin (A) thus obtained has an impaired hue and impaired light resistance. In addition, there is a possibility that an unreacted starting material might volatilize during the polymerization to change the molar proportions of the dihydroxy compounds comprising the dihydroxy compounds to be used in the invention and of the carbonic diester represented by the formula (4) and a desired molecular weight might not be reached. On the other hand, in the case where the polymerization catalyst is used in too large an amount, there is a possibility that the resultant polycarbonate resin (A) might have an impaired hue and impaired light resistance.

In the case where diphenyl carbonate or a substituted diphenyl carbonate, e.g., ditolyl carbonate, is used as a carbonic diester represented by the formula (4) to produce a polycarbonate resin (A) to be used in the invention, phenol or a substituted phenol generates as a by-product and unavoidably remains in the polycarbonate resin (A). However, since phenol and the substituted phenol also have an aromatic ring, there are the cases where not only these compounds absorb ultraviolet rays to serve as a factor contributing to a deterioration in light resistance but also the compounds are causative of an odor during molding. After an ordinary batch reaction, the polycarbonate resin (A) contains an aromatic monohydroxy compound having an aromatic ring, e.g., by-product phenol, in an amount of 1,000 weight ppm or more. From the standpoints of light resistance and odor diminution, it is preferred to reduce the content thereof to preferably 700 weight ppm or less, more preferably 500 weight ppm or less, especially 300 weight ppm or less, using a horizontal reactor having excellent volatilizing performance or using an extruder having a vacuum vent. It is, however, noted that it is difficult to industrially completely remove the aromatic monohydroxy compound, and the lower limit of the content thereof is generally 1 weight ppm.

Those aromatic monohydroxy compounds may, of course, have substituents, depending on the starting materials used. For example, the compounds may have an alkyl group having up to 5 carbon atoms or the like.

There is a possibility that when Group-1 metals, especially lithium, sodium, potassium, and cesium, in particular, sodium, potassium, and cesium, are contained in the polycarbonate resin (A) in a large amount, these metals might adversely affect the hue. These metals do not come only from the catalyst used but may come from starting materials and the reactor. Consequently, the total amount of compounds of those metals in the polycarbonate resin (A) is generally 1 weight ppm or less, preferably 0.8 weight ppm or less, more preferably 0.7 weight ppm or less, in terms of metal amount.

The content of metals in the polycarbonate resin (A) can be determined by recovering the metals contained in the polycarbonate resin by a technique such as wet ashing and then determining the amount of the metals using a technique such as atomic emission, atomic absorption, or inductively coupled plasma (ICP) spectroscopy.

<Process for Producing Polycarbonate Resin (A)>

Although the polycarbonate resin (A) to be used in the invention is obtained by condensation-polymerizing dihydroxy compounds at least comprising a dihydroxy compound (a) having the site represented by the formula (1) according to the invention and a dihydroxy compound (b) of an aliphatic hydrocarbon with a carbonic diester represented by the formula (4) by means of a transesterification reaction, it is preferred to evenly mix the starting materials, i.e., the dihydroxy compounds and the carbonic diester, prior to the transesterification reaction.

The temperature at which the starting materials are mixed together is generally 80° C. or higher, preferably 90° C. or higher, and the upper limit thereof is generally 250° C. or lower, preferably 200° C. or lower, more preferably 150° C. or lower. Especially suitable is a temperature of 100-120° C. In the case where the mixing temperature is too low, there is the possibility of resulting in too low a dissolution rate or in insufficient solubility. In addition, there are often the cases where troubles such as solidification arise. When the mixing temperature is too high, there are the cases where the dihydroxy compounds deteriorate thermally. There is hence a possibility that the resultant polycarbonate resin has an impaired hue and this adversely affects light resistance.

It is preferred from the standpoint of preventing hue deterioration that an operation for mixing the dihydroxy compounds comprising the dihydroxy compounds to be used for the invention and the carbonic diester represented by the formula (4), which are starting materials for the polycarbonate resin (A) to be used in the invention, should be conducted in an atmosphere having an oxygen concentration of 10 vol % or less, preferably 0.0001-10 vol %, especially 0.0001-5 vol %, in particular 0.0001-1 vol %.

It is preferred that for obtaining the polycarbonate resin (A) to be used in the invention, the carbonic diester represented by the formula (4) should be used in such an amount that the molar proportion thereof to the dihydroxy compounds to be subjected to the reaction, which comprise the dihydroxy compounds to be used for the invention, is 0.90-1.20. The molar proportion thereof is more preferably 0.95-1.10.

In the case where the molar proportion thereof is too low, there is a possibility that the polycarbonate resin produced might have an increased amount of terminal hydroxyl groups and this might impair the thermal stability of the polymer and cause the polymer to take a color upon molding. There also is a possibility that the rate of transesterification reaction might decrease or a desired high-molecular polymer might not be obtained.

On the other hand, when the molar proportion thereof is too high, there are the cases where the rate of transesterification reaction decreases or it is difficult to produce the polycarbonate resin (A) having a desired molecular weight. The decrease in the rate of transesterification reaction enhances heat history during the polymerization reaction, resulting in a possibility that the enhanced heat history might impair the hue and light resistance of the polycarbonate resin obtained.

Furthermore, when the molar proportion of the carbonic diester represented by the formula (4) to the dihydroxy compounds comprising the dihydroxy compounds to be used for the invention is too high, there are the cases where the polycarbonate resin (A) obtained has an increased content of the residual carbonic diester and the residual carbonic diester absorbs ultraviolet rays to impair the light resistance of the polycarbonate resin. Such too high proportions of the carbonic diester are hence undesirable. The concentration of the carbonic diester remaining in the polycarbonate resin (A) to be used in the invention is preferably 200 weight ppm or less, more preferably 100 weight ppm or less, especially preferably 60 weight ppm or less, in particular 30 weight ppm or less. Actually, the polycarbonate resin (A) may contain unreacted carbonic diesters. A lower limit of the concentration thereof is generally 1 weight ppm.

In the invention, a process in which the dihydroxy compounds are condensation-polymerized with the carbonic diester is conducted in the presence of the catalyst described above usually in multiple stages using a plurality of reactors. The mode of reaction operation may be any of the batch type, the continuous type, and a combination of the batch type and the continuous type.

It is preferred that in the initial stage of the polymerization, the polymerization should be conducted at a relatively low temperature and under relatively low vacuum to obtain a prepolymer, and that in the late stage of the polymerization, the polymerization should be conducted at a relatively high temperature under relatively high vacuum to heighten the molecular weight to a given value. It is, however, important from the standpoints of hue and light resistance that a jacket temperature, an internal temperature, and an internal pressure of the system should be suitably selected for each molecular-weight stage. For example, in the case where either temperature or pressure is changed before the polymerization reaction reaches a given value, an unreacted monomer is distilled off to change the molar ratio of the dihydroxy compounds to the carbonic diester. This may result in a decrease in polymerization rate or make it impossible to obtain a polymer having a given molecular weight or having given end groups. There hence is a possibility that the objects of the invention cannot finally be accomplished.

To provide a polymerizer with a reflux condenser is effective for inhibiting the monomers from being distilled off. This effect is high especially in the reactor for the initial stage of polymerization, in which the amount of unreacted monomer ingredients is large. The temperature of the coolant which is being introduced into the reflux condenser can be suitably selected according to the monomers used. However, the temperature of the coolant being introduced into the reflux condenser, as measured at the inlet of the reflux condenser, is generally 45-180° C., preferably 80-150° C., especially preferably 100-130° C. In the case where the temperature of the coolant being introduced into the reflux condenser is too high, the amount of the monomers being refluxed decreases, resulting in a decrease in the effect of the refluxing. In the case where the temperature thereof is too low, the efficiency of the removal by distillation of the monohydroxy compound to be removed by distillation tends to decrease. As the coolant, use may be made of hot water, steam, a heat-medium oil, or the like. Preferred is steam or a heat-medium oil.

The selection of the kind and amount of a catalyst described above is important for maintaining a suitable polymerization rate and inhibiting the monomers from being distilled off and for simultaneously enabling the finally obtained polycarbonate resin to have intact properties such as hue, thermal stability, and light resistance.

It is preferred that the polycarbonate resin (A) to be used in the invention should be produced by polymerizing the starting materials in multiple stages using a catalyst and a plurality of reactors. The reasons why the polymerization is conducted in a plurality of reactors are that in the initial stage of the polymerization reaction, since the monomers are contained in a large amount in the liquid reaction mixture, it is important that the monomers should be inhibited from volatilizing off while maintaining a necessary polymerization rate, and that in the late stage of the polymerization reaction, it is important to sufficiently remove by distillation the by-product monohydroxy compound in order to shift the equilibrium to the polymerization side. For thus setting different sets of polymerization reaction conditions, it is preferred to use a plurality of polymerizers arranged serially, from the standpoint of production efficiency.

The number of reactors to be used in the process of the invention is not limited so long as the number thereof is at least 2 as described above. From the standpoints of production efficiency, etc., the number thereof is 3 or more, preferably 3-5, especially preferably 4.

In the invention, the process may be conducted in various manners so long as two or more reactors are used. For example, a plurality of reaction stages differing in conditions are formed in any of the reactors, or the temperature and the pressure may be continuously changed in any of the reactors.

In the invention, the polymerization catalyst can be introduced into a starting-material preparation tank or a starting-material storage tank, or can be introduced directly into a polymerization vessel. However, from the standpoints of stability of feeding and polymerization control, a catalyst supply line is disposed somewhere in a starting-material line before a polymerization vessel, and the catalyst is supplied preferably in the form of an aqueous solution. With respect to polymerization reaction temperature, too low temperatures result in a decrease in productivity and cause the product to undergo an enhanced heat history. Too high temperatures not only result in monomer volatilization but also result in the possibility of enhancing degradation and coloring of the polycarbonate resin.

Specifically, the reaction in the first stage may be conducted at a temperature of 140-270° C., preferably 180-240° C., more preferably 200-230° C., in terms of the maximum internal temperature of the polymerizer, and a pressure of 110-1 kPa, preferably 70-5 kPa, more preferably 30-10 kPa (absolute pressure), for 0.1-10 hours, preferably 0.5-3 hours, while the monohydroxy compound which generates is being removed from the reaction system by distillation.

In the second and any succeeding stages, the pressure of the reaction system is gradually lowered from the pressure used in the first stage, and the polymerization is conducted while the monohydroxy compound which generates is being continuously removed from the reaction system. Finally, the pressure (absolute pressure) of the reaction system is lowered to 200 Pa or below. The second and any succeeding stages are thus conducted at a maximum internal temperature of 210-270° C., preferably 220-250° C., for a period of generally 0.1-10 hours, preferably 1-6 hours, especially preferably 0.5-3 hours.

Especially from the standpoints of inhibiting the polycarbonate resin (A) from taking a color or deteriorating thermally and of thereby obtaining the polycarbonate resin (A) having a satisfactory hue and satisfactory light resistance, it is preferred that the maximum internal temperature in all reaction stages should be lower than 250° C., in particular 225-245° C. From the standpoints of inhibiting the rate of polymerization from decreasing in the latter half of the polymerization reaction and of thereby minimizing the deterioration caused by heat history, it is preferred to use, in the final stage of the polymerization, a horizontal reactor having excellent plug flow characteristics and interface renewal characteristics.

In the case where the polymerization is conducted at too high a temperature or for too long a period in order to obtain a polycarbonate resin (A) having a given molecular weight, there is a tendency that the resultant polycarbonate resin has a reduced ultraviolet transmittance and an increased YI value.

From the standpoint of effective utilization of resources, it is preferred that the monohydroxy compound which generated as a by-product should be reused as a starting material for diphenyl carbonate, bisphenol A, or the like after purified according to need.

The polycarbonate resin (A) to be used in the invention, after having been obtained through polycondensation as described above, is usually solidified by cooling and pelletized with a rotary cutter or the like.

Methods for the pelletization are not limited. Examples thereof include: a method in which the polycarbonate resin is discharged in a molten state from the final polymerizer, cooled and solidified in a strand form, and pelletized; a method in which the resin is fed in a molten state from the final polymerizer to a single- or twin-screw extruder, melt-extruded, subsequently cooled and solidified, and pelletized; and a method which includes discharging the resin in a molten state from the final polymerizer, cooling and solidifying the resin in a strand form, temporarily pelletizing the resin, thereafter feeding the resin to a single- or twin-screw extruder again, melt-extruding the resin, and then cooling, solidifying, and pelletizing the resin.

During such operations, residual monomers can be removed by volatilization under vacuum within the extruder. It is also possible to add generally known additives such as a heat stabilizer, neutralizing agent, ultraviolet absorber, release agent, colorant, antistatic agent, slip agent, lubricant, plasticizer, compatibilizing agent, and flame retardant and knead the mixture within the extruder.

The temperature to be used for melt kneading in the extruder depends on the glass transition temperature and molecular weight of the polycarbonate resin (A). However, the melt kneading temperature is generally 150-300° C., preferably 200-270° C., more preferably 230-260° C. In the case where the melt kneading temperature is lower than 150° C., the polycarbonate resin (A) has a high melt viscosity and imposes an increased load on the extruder, resulting in a decrease in productivity. In the case where the melt kneading temperature is higher than 300° C., the polycarbonate thermally deteriorates considerably, resulting in a decrease in mechanical strength due to the decrease in molecular weight and further resulting in coloring and gas evolution.

When the polycarbonate resin (A) to be used in the invention is produced, it is desirable to dispose a filter in order to prevent inclusion of foreign matter. The position where a filter is disposed preferably is on the downstream side of the extruder. The rejection size (opening size) of the filter is preferably 100 µm or smaller in terms of 99% removal filtration accuracy. Especially when the resin is for use in film applications or the like for which inclusion of minute foreign particles should be avoided, the opening size of the filter is preferably 40 µm or smaller, more preferably 10 µm or smaller.

From the standpoint of preventing inclusion of foreign matter from occurring after extrusion, it is desirable that the polycarbonate resin (A) to be used in the invention should be extruded in a clean room having a cleanliness preferably higher than class 7 defined in JIS B 9920 (2002), more preferably higher than class 6.

Furthermore, for cooling and pelletizing the extruded polycarbonate resin, it is preferred to use a cooling method such as air cooling or water cooling. It is desirable that air from which airborne foreign matter has been removed beforehand with a high-efficiency particulate air filter or the like should be used for the air cooling to prevent airborne foreign matter from adhering again. In the case of conducting water cooling, it is desirable to use water from which metallic substances have been removed with an ion-exchange resin or the like and from which foreign matter has been removed with a filter. It is preferred that the filter to be used should have an opening size of 10-0.45 µm in terms of 99% removal filtration accuracy.

The molecular weight of the thus-obtained polycarbonate resin (A) to be used in the invention can be expressed in terms of reduced viscosity. The reduced viscosity thereof is generally 0.20 dL/g or higher, preferably 0.30 dL/g or higher, more preferably 0.35 dL/g or higher. The upper limit of the reduced viscosity thereof may be 1.20 dL/g or less and is more preferably 1.00 dL/g or less, even more preferably 0.80 dL/g or less.

In the case where the reduced viscosity of the polycarbonate resin (A) is too low, there is a possibility that this polycarbonate resin (A) might give molded articles having low mechanical strength. In the case where the reduced viscosity thereof is too high, this polycarbonate resin (A) tends to show reduced flowability during molding, resulting in decreases in productivity and moldability.

Incidentally, the reduced viscosity of a polycarbonate is determined by preparing a solution thereof having a polycarbonate concentration precisely adjusted to 0.6 g/dL using methylene chloride as a solvent and measuring the viscosity of the solution with an Ubbelohde viscometer at a temperature of 20.0±0.1° C.

In the polycarbonate resin (A) to be used in the invention, the lower limit of the concentration of the end group represented by the following formula (5) is generally 20 µeq/g, preferably 40 µeq/g, especially preferably 50 µeq/g. The upper limit thereof is generally 160 µeq/g, preferably 140 µeq/g, especially preferably 100 µeq/g.

In the case where the concentration of the end group represented by the following formula (5) is too high, there is a possibility that even when the polycarbonate resin has a satisfactory hue immediately after polymerization or during molding, the high end group concentration might result in a hue deterioration through exposure to ultraviolet rays. Conversely, in the case where the concentration thereof is too low, there is a possibility that this polycarbonate resin might have reduced thermal stability.

Examples of methods for regulating the concentration of the end group represented by the following formula (5) include: to regulate the molar proportions of the starting materials, i.e., dihydroxy compounds comprising the dihydroxy compounds to be used in the invention and a carbonic diester represented by the formula (4); and to control factors during the transesterification reaction, such as the kind and amount of a catalyst, polymerization pressure, and polymerization temperature.

[Chem. 7]

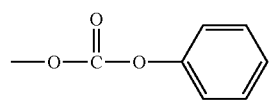

(5)

When the number of moles of the H bonded to the aromatic rings of the polycarbonate resin (A) to be used in the invention is expressed by C and the number of moles of the H bonded to the part other than the aromatic rings is expressed by D, then the proportion of the number of moles of the H bonded to the aromatic rings to the number of moles of all H is expressed by C/(C+D). Since there is a possibility that the aromatic rings, which have ultraviolet-absorbing ability, might affect light resistance as stated above, it is preferred that C/(C+D) should be 0.1 or less, more preferably 0.05 or less, even more preferably 0.02 or less, especially preferably 0.01 or less. The value of C/(C+D) can be determined by $^1$H NMR spectroscopy.

The polycarbonate resin (A) has a glass transition temperature of preferably 75-105° C., more preferably 80-105° C., even more preferably 85-105° C. By using the polycarbonate resin (A) having a glass transition temperature within that range, molded articles having excellent heat resistance can be provided.

<Aromatic Polycarbonate Resin (B)>

The aromatic polycarbonate resin (B) to be used in the invention can be any conventionally known aromatic polycarbonate resin so long as this polycarbonate resin is made up of constitutional units derived from dihydroxy compounds and linked to each other through a carbonate bond and has aromatic rings in the structure thereof. The aromatic polycarbonate resin (B) may contain constitutional units derived from a dihydroxy compound having the site represented by the formula (1). It is preferred that the aromatic polycarbonate resin (B) should be a polycarbonate resin in which constitutional units each derived from a dihydroxy compound having an aromatic ring are contained in a largest proportion among all constitutional units each derived from a dihydroxy compound. In this polycarbonate resin, the proportion of the constitutional units each derived from a dihydroxy compound having an aromatic ring based on all constitutional units each derived from a dihydroxy compound is more preferably 50% by mole or more, even more preferably 70% by mole or more, especially preferably 90% by mole or more. It is, however, noted that when the aromatic polycarbonate resin (B) to be used is a polycarbonate resin which contains constitutional units derived from a dihydroxy compound having the site represented by the formula (1), then this polycarbonate resin differs in structure from the polycarbonate resin (A).

The aromatic polycarbonate resin (B) to be used in the invention may be a homopolymer or a copolymer. The aromatic polycarbonate resin (B) may have a branched structure.

More specifically, the aromatic polycarbonate resin (B) may be a polycarbonate resin having a repeating structure represented by the following formula (6).

[Chem. 8]

(6)

In the formula (6), $Ar^1$ and $Ar^2$ each represent an arylene group which may have one or more substituents, and X represents a single bond or a divalent group. The arylene group which may have one or more substituents is not particularly limited so long as the group is an arylene group. However, the arylene group preferably is an arylene group comprising up to 3 aromatic rings, and more preferably is a phenylene group. Examples of the substituents which may be possessed independently by $Ar^1$ and $Ar^2$ include alkyl groups which have 1-10 carbon atoms and may have one or more substituents, alkoxy groups which have 1-10 carbon atoms and may have substituents, halogen radicals, halogenated alkyl groups having 1-10 carbon atoms, or aromatic groups which have 6-20 carbon atoms and may have substituents. Preferred of these substituents are alkyl groups which have 1-10 carbon atoms and may have substituents or aromatic groups which have 6-20 carbon atoms and may have one or more substituents. More preferred are alkyl groups having 1-10 carbon atoms. Especially preferred is methyl.

Examples of the divalent group include chain-structure alkylene groups which have 1-6 carbon atoms and may have one or more substituents, chain-structure alkylidene groups which have 1-6 carbon atoms and may have one or more substituents, cyclic-structure alkylene groups which have 3-6 carbon atoms and may have substituents, and cyclic-structure alkylidene groups which have 3-6 carbon atoms and may have substituents, and further comprise —O—, —S—, —CO—, or —SO$_2$—. The substituents possessed by the chain-structure alkylene groups having 1-6 carbon atoms preferably are aryl groups, and phenyl groups is especially preferred.

The constitutional units which are derived from one or more dihydroxy compounds and which constitute the aromatic polycarbonate resin (B) to be used in the invention each is a unit formed by removing the hydrogen atoms from the hydroxyl groups of a dihydroxy compound. Examples of the corresponding dihydroxy compounds include the following.

Biphenyl compounds such as 4,4'-biphenol, 2,4'-biphenol, 3,3'-dimethyl-4,4'-dihydroxy-1,1'-biphenyl, 3,3'-dimethyl-2, 4'-dihydroxy-1,1'-biphenyl, 3,3'-di(t-butyl)-4,4'-dihydroxy-1,1'-biphenyl, 3,3',5,5'-tetramethyl-4,4'-dihydroxy-1,1'-biphenyl, 3,3',5,5'-tetra(t-butyl)-4,4'-dihydroxy-1,1'-biphenyl, and 2,2',3,3',5,5'-hexamethyl-4,4'-dihydroxy-1,1'-biphenyl.

Bisphenol compounds such as bis(4-hydroxy-3,5-dimethylphenyl)methane, bis(4-hydroxyphenyl)methane, bis(4-hydroxy-3-methylphenyl)methane, 1,1-bis(4-hydroxyphenyl)ethane, 1,1-bis(4-hydroxyphenyl)propane, 2,2-bis(4-hydroxyphenyl)propane, 2,2-bis(4-hydroxy-3-methylphenyl)propane, 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 1,1-bis(4-hydroxyphenyl)cyclopentane, 1,1-bis(4-hydroxyphenyl)cyclohexane, bis(3-phenyl-4-hydroxyphenyl)methane, 1,1-bis(3-phenyl-4-hydroxyphenyl)ethane, 1,1-bis(3-phenyl-4-hydroxyphenyl)propane, 2,2-bis(3-phenyl-4-hydroxyphenyl)propane, 1,1-bis(4-hydroxy-3-methylphenyl)ethane, 2,2-bis(4-hydroxy-3-ethylphenyl) propane, 2,2-bis(4-hydroxy-3-isopropylphenyl)propane, 2,2-bis(4-hydroxy-3-sec-butylphenyl)propane, 1,1-bis(4-hydroxy-3,5-dimethylphenyl)ethane, 2,2-bis(4-hydroxy-3,5-dimethylphenyl)propane, 1,1-bis(4-hydroxy-3,6-dimethylphenyl)ethane, bis(4-hydroxy-2,3,5-trimethylphenyl)methane, 1,1-bis(4-hydroxy-2,3,5-trimethylphenyl)ethane, 2,2-bis(4-hydroxy-2,3,5-trimethylphenyl)propane, bis(4-hydroxy-2,3,5-trimethylphenyl)phenylmethane, 1,1-bis(4-hydroxy-2,3,5-trimethylphenyl)phenylethane, 1,1-bis(4-hydroxy-2,3,5-trimethylphenyl)cyclohexane, bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, bis(4-hydroxyphenyl)dibenzylmethane, 4,4'-[1,4-phenylenebis(1-methylethylidene)]bis[phenol], 4,4'-[1,4-phenylenebismethylene]bis[phenol], 4,4'-[1,4-phenylenebis(1-methylethylidene)]bis[2,6-dimethylphenol], 4,4'-[1,4-phenylenebismethylene]bis[2,6-dimethylphenol], 4,4'-[1,4-phenylenebismethylene]bis[2,3,6-trimethylphenol], 4,4'-[1, 4-phenylenebis(1-methylethylidene)]bis[2,3,6-trimethylphenol], 4,4'-[1,3-phenylenebis(1-methylethylidene)]bis[2,3,6-trimethylphenol], 4,4'-dihydroxydiphenyl ether, 4,4'-dihydroxydiphenyl sulfone, 4,4'-dihydroxydiphenyl sulfide, 3,3',5,5'-tetramethyl-4,4'-dihydroxydiphenyl ether, 3,3',5,5'-tetramethyl-4,4'-dihydroxydiphenyl sulfone, 3,3',5,5'-tetramethyl-4,4'-dihydroxydiphenyl sulfide, phenolphthalein, 4,4'-[1,4-phenylenebis(1-methylvinylidene)]bisphenol, 4,4'-[1,4-phenylenebis(1-methylvinylidene)]bis[2-methylphenol], (2-hydroxyphenyl)(4-hydroxyphenyl)methane, (2-hydroxy-5-methylphenyl)(4-hydroxy-3-methylphenyl)methane, 1,1-(2-hydroxyphenyl)(4-hydroxyphenyl)ethane, 2,2-(2-hydroxyphenyl)(4-hydroxyphenyl)propane, and 1,1-(2-hydroxyphenyl)(4-hydroxyphenyepropane.

Halogenated bisphenol compounds such as 2,2-bis(3,5-dibromo-4-hydroxyphenyl)propane and 2,2-bis(3,5-dichloro-4-hydroxyphenyl)propane.

Preferred of these dihydroxy compounds are bisphenol compounds in which the phenol analogue moieties are linked to each other through an alkylidene group, such as bis(4-hydroxy-3,5-dimethylphenyl)methane, bis(4-hydroxyphenyl)methane, bis(4-hydroxy-3-methylphenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3,5-dimethylphenyl)propane, 1,1-bis(4-hydroxyphenyl)cyclohexane, bis(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, 2-hydroxyphenyl(4-hydroxyphenyl)methane, and 2,2-(2-hydroxyphenyl)(4-hydroxyphenyl) propane.

Especially preferred of these are the bisphenol compounds in which the alkylidene group has up to 6 carbon atoms, such as bis(4-hydroxyphenyl)methane, bis(4-hydroxy-3-methylphenyl)methane, bis(4-hydroxy-3,5-dimethylphenyl) methane, 2,2-bis(4-hydroxyphenyl)propane, 2,2-bis(4-hydroxy-3-methylphenyl)propane, 2,2-bis(4-hydroxy-3,5-dimethylphenyl)propane, and 1,1-bis(4-hydroxyphenyl) cyclohexane.

For producing the aromatic polycarbonate resin (B) to be used in the invention, any conventionally known process, such as a phosgene method, transesterification method, or pyridine method, may be used. A process for producing the aromatic polycarbonate resin (B) by a transesterification method is explained below as an example. The transesterification method is a production method in which a dihydroxy compound and a carbonic diester are subjected to melt transesterification polycondensation in the presence of a basic catalyst and an acidic substance for neutralizing the basic catalyst. Examples of the dihydroxy compound include the biphenyl compounds and bisphenol compounds shown above as examples.

Representative examples of the carbonic diester include diaryl carbonates such as diphenyl carbonate, ditolyl carbonate, bis(chlorophenyl) carbonate, di-m-cresyl carbonate, dinaphthyl carbonate, and bis(biphenyl) carbonate and dialkyl carbonates such as diethyl carbonate, dimethyl carbonate, dibutyl carbonate, and dicyclohexyl carbonate. It is especially preferred to use diphenyl carbonate among these.

From the standpoint of a balance between mechanical properties and moldability, the viscosity-average molecular weight of the aromatic polycarbonate resin (B) to be used in the invention is generally 8,000-100,000, preferably 10,000-50,000, more preferably 15,000-35,000. The reduced viscosity of the aromatic polycarbonate resin (B) is determined by preparing a solution thereof having a polycarbonate concentration precisely adjusted to 0.60 g/dL using methylene chloride as a solvent and measuring the viscosity of the solution at a temperature of 20.0±0.1° C. The reduced viscosity of the aromatic polycarbonate resin (B) to be used is generally 0.23-0.80 dL/g, preferably 0.27-0.72 dL/g, more preferably 0.40-0.61 dL/g, even more preferably 0.50 dL/g or higher.

It is preferred that the aromatic polycarbonate resin (B) to be used in the invention should have a glass transition temperature of 110-180° C.

In the invention, one aromatic polycarbonate resin (B) may be used alone or a mixture of two or more aromatic polycarbonate resins (B) may be used.

<Polycarbonate Resin Composition (X)>

The polycarbonate resin composition (X) of the invention is a polycarbonate resin composition (X) which comprises: a polycarbonate resin (A) comprising a constitutional unit derived from a dihydroxy compound (a) having, as part of the structure thereof, the site represented by the following formula (1) and a constitutional unit derived from a dihydroxy compound (b) of an aliphatic hydrocarbon; and an aromatic polycarbonate resin (B). However, the case where the site represented by the formula (1) is part of —CH$_2$—O—H is omitted.

[Chem. 9]

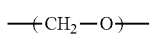

(1)

The polycarbonate resin composition (X) of the invention is characterized by simultaneously comprising: a polycarbonate resin (A) which is a polycarbonate resin comprising a constitutional unit derived from a dihydroxy compound (a) having, as part of the structure thereof, the site represented by the following formula (1) and a constitutional unit derived from a dihydroxy compound (b) of an aliphatic hydrocarbon and in which the proportion of the constitutional unit derived from the dihydroxy compound (b) of an aliphatic hydrocarbon based on all constitutional units each derived from a dihydroxy compound is 45% by mole or more; and an aromatic polycarbonate resin (B). The proportions of the polycarbonate resin (A) and the aromatic polycarbonate resin (B) are not particularly limited. It is, however, preferred that the polycarbonate resin (A) and the aromatic polycarbonate resin (B) should be contained in an (A)/(B) weight ratio of preferably from 1:99 to 99:1, more preferably from 5:95 to 95:5, especially from 10:90 to 90:10. When the composition contains a polycarbonate resin which can be regarded as either a polycarbonate resin (A) or an aromatic polycarbonate resin (B), then this polycarbonate resin may be taken at will as a polycarbonate resin (A) or an aromatic polycarbonate resin (B) and regulated so as to be contained in a proportion within that range. In order to sufficiently obtain the effects of the invention, the polycarbonate resin (A) and the aromatic polycarbonate resin (B) are used in such amounts that at least one polycarbonate resin selected from the polycarbonate resins accounts for preferably 20 parts by weight or more, more preferably 35 parts by weight or more, even more preferably 50 parts by weight or more, especially preferably 75 parts by weight or more, of 100 parts by weight of the polycarbonate resin composition (X). From the standpoint of obtaining the effects of the invention, it is especially preferred that the polycarbonate resin ingredients to be used in the polycarbonate resin composition (X) of the invention should be wholly accounted for by the polycarbonate resin (A) and the aromatic polycarbonate resin (B).

In the case where the proportion of the constitutional unit derived from the dihydroxy compound (b) of an aliphatic hydrocarbon in the polycarbonate resin (A) is less than the lower limit specified in the invention, the polycarbonate resin composition (X) tends to have a reduced total light transmittance and an increased value of initial yellowness index (YI). In the case where the proportion of the polycarbonate resin (A) in the polycarbonate resin composition (X) is too low, this composition tends to have an increased value of yellowness index (YI) after the sunshine weatherometer irradiation test which will be described later.

It is preferred that the polycarbonate resin composition (X) according to the invention should have a single glass transition temperature from the standpoint of enabling the polycarbonate resin composition and molded articles obtained by molding the polycarbonate resin composition to retain transparency.

In the invention, that the polycarbonate resin composition (X) has a single glass transition temperature means that when the polycarbonate resin composition (X) is examined for the temperature dispersion of dynamic viscoelasticity under the conditions of a strain of 0.1%, frequency of 10 Hz, and heating rate of 3° C./min (dynamic viscoelasticity measurement as provided for in JIS K7198 method A (1991)), then the resultant loss tangent (tan δ) curve has one main dispersion peak, that is, there is one maximal value of loss tangent (tan δ). When the polycarbonate resin composition (X) has a single glass transition temperature, the resin composition obtained can have excellent transparency.

That the polycarbonate resin composition (X) has a single glass transition temperature can be considered to mean that when this polycarbonate resin composition (X) is subjected to the dynamic viscoelasticity measurement, the resultant loss modulus (E") curve has one main dispersion peak, that is, there is one maximal value of loss modulus (E").

Besides the dynamic viscoelasticity measurement, differential scanning calorimetry or the like can be used to ascertain that the composition has a single glass transition temperature. Specifically, that the polycarbonate resin composition (X) has a single glass transition temperature can be considered to mean that when the composition is examined for glass transition temperature with a differential scanning calorimeter (DSC) at a heating rate of 10° C./min in accordance with JIS K7121 (1987), the resultant curve has only one inflection point, which indicates the glass transition temperature.

In general, that a polymer blend composition has a single glass transition temperature means that the resins which have been mixed together are in the state of having been blended into a stable homogeneous mixture on the order of nanometer (molecular level). This composition can be regarded as a stable homogeneous system.

The glass transition temperature of the polycarbonate resin composition (X) is expressed in terms of the temperature which indicates the peak value of the main dispersion of loss tangent (tan δ) determined through the examination of the temperature dispersion of dynamic viscoelasticity. It is preferred that the glass transition temperature thereof should be in the range of from the glass transition temperature of the polycarbonate resin (A) to the glass transition temperature of the aromatic polycarbonate resin (B).

The polycarbonate resin (A) and the aromatic polycarbonate resin (B) can be mixed in any desired ratio so that the proportion of the polycarbonate resin (A) in the polycarbonate resin composition (X) comprising the polycarbonate resin (A) and the aromatic polycarbonate resin (B) is in the range of 1-99% by mass. In particular, the lower limit thereof is preferably 50% by mass or more, more preferably 55% by mass or more, especially preferably 60% by mass or more. Regulating the proportion of the polycarbonate resin (A) to 50-99% by mass makes it possible to provide a resin composition which is excellent not only in heat resistance, impact resistance, and flowability but also in weather resistance and which therefore is highly suitable also for applications where the composition is used mainly outdoors.

The polycarbonate resin (A) and aromatic polycarbonate resin (B) which constitute the resin composition of the invention have excellent compatibility. Preferably, the polycarbonate resin composition (X) comprising the polycarbonate resin (A) and the aromatic polycarbonate resin (B) has a single glass transition temperature, which corresponds to the peak value of the main dispersion of loss tangent (tan δ) determined through the examination of the temperature dispersion of dynamic viscoelasticity, and this glass transition temperature is not lower than the glass transition temperature of the polycarbonate resin (A) and not higher than the glass transition temperature of the aromatic polycarbonate resin (B). This composition is excellent not only in heat resistance and impact resistance but also in transparency.

Furthermore, the glass transition temperature of the polycarbonate resin composition (X) according to the invention is preferably 75-130° C., more preferably 80-125° C., even more preferably 85-120° C. By regulating the polycarbonate resin composition (X) so as to have a glass transition temperature within that range, the resin composition having excellent heat resistance can be provided.

<Resins Other than Polycarbonate Resins>

The polycarbonate resin composition and polycarbonate resin molded articles of the invention can contain not only resins other than polycarbonate resins but also additives which are not resins.

Examples of resins which are not polycarbonate resins and can be incorporated for the purpose of further improving or regulating moldability or other properties include resins such as polyester resins, polyethers, polyamides, polyolefins, and poly(methyl methacrylate) and rubbery modifiers such as core-shell type, graft type, or linear random and block copolymers. With respect to the amount of such resins to be incorporated other than polycarbonate resins, it is preferred to incorporate such other resins in an amount of 1-30 parts by weight per 100 parts by weight of the mixture of the polycarbonate resin (A) and aromatic polycarbonate resin (B) to be used in the invention. The amount of such other resins to be incorporated is more preferably 3-20 parts by weight, even more preferably 5-10 parts by weight.

<Heat Stabilizer>

A heat stabilizer can be incorporated into the polycarbonate resin composition and polycarbonate resin molded articles of the invention in order to prevent the composition from decreasing in molecular weight and deteriorating in hue during molding. Examples of the heat stabilizer include phosphorous acid, phosphoric acid, phosphonous acid, phosphonic acid, and esters thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are trisnonylphenyl phosphite, trimethyl phosphate, tris(2,4-di-tert-butylphenyl) phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these heat stabilizers may be used alone, or two or more thereof may be used in combination. With respect to the amount of the heat stabilizer to be incorporated, it is preferred to incorporate the heat stabilizer in an amount of 0.0001-1 part by weight per 100 parts by weight of the mixture of the polycarbonate resin (A) and aromatic polycarbonate resin (B) to be used in the invention. The amount of the heat stabilizer to be incorporated is more preferably 0.0005-0.5 parts by weight, even more preferably 0.001-0.2 parts by weight. By incorporating a heat stabilizer in an amount within that range, the resins can be prevented from decreasing in molecular weight or discoloring, while preventing the additive from bleeding or arousing other troubles.

<Antioxidant>

A generally known antioxidant can be incorporated into the polycarbonate resin composition and polycarbonate resin molded articles of the invention for the purpose of preventing oxidation. Examples of the antioxidant include one or more of pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamamide), diethyl 3,5-di-tert-butyl-4-hydroxybenzylphosphonate, tris(3,5-di-tert-butyl-4-hydroxybenzyl)isocyanurate, tetrakis(2,4-di-tert-butylphenyl) 4,4'-biphenylenediphosphinate, 3,9-bis{1,1-dimethyl-2-[β-(3-tert-butyl-4-hydroxy-5-methylphenyl)propionyloxy]ethyl}-2,4,8,10-tetraoxaspiro(5,5)undecane, and the like. With respect to the amount of the antioxidant to be incorporated, it is preferred to incorporate the antioxidant in an amount of 0.0001-1 part by weight per 100 parts by weight of the mixture of the polycarbonate resin (A) and aromatic polycarbonate resin (B) to be used in the invention.

The amount of the antioxidant to be incorporated is more preferably 0.0005-0.5 parts by weight, even more preferably 0.001-0.2 parts by weight. By incorporating an antioxidant in an amount within that range, the resins can be prevented from oxidatively deteriorating, while preventing the antioxidant from bleeding to the surfaces of the molded objects and from reducing the mechanical properties of the various molded articles.

<Ultraviolet Absorber>

An ultraviolet absorber can be incorporated for the purpose of further improving the weather resistance of the polycarbonate resin composition and polycarbonate resin molded articles of the invention. Examples of the ultraviolet absorber include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyebenzotriazole, 2-[2-hydroxy-3,5-bis(α,α-dimethylbenzyl)phenyl]-2H-benzotriazole, 2,2'-methylenebis(4-cumyl-6-benzotriazolephenyl), and 2,2'-p-phenylenebis(1,3-benzoxazin-4-one). Ultraviolet absorbers having a melting point in the range of, in particular, 120-250° C. are preferred. When an ultraviolet absorber having a melting point of 120° C. or higher is used, the surface dulling of molded articles which is caused by a gas is mitigated. Specifically, use is made of a benzotriazole-based ultraviolet absorber such as 2-(2'-hydroxy-5'-methylphenyl) benzotriazole, 2-(2'-hydroxy-3'-tert-butyl-5'-methylphenyl)-5-chlorobenzotriazole, 2-[2'-hydroxy-3'-(3",4",5",6"-tetrahydrophthalimidomethyl)-5'-methylphenyl]benzotriazole, 2,2-methylenebis[4-(1,1,3,3-tetramethylbutyl)-6-(2H-benzotriazol-2-yl)phenol, or 2-(2-hydroxy-3,5-dicumylphenyl)benzotriazole. Especially preferred of these are 2-(2-hydroxy-3,5-dicumylphenyl)benzotriazole and 2,2-methylenebis[4-(1,1,3,3-tetramethylbutyl)-6-(2H-benzotriazol-2-yl)phenol. One of these ultraviolet absorbers may be used alone, or two or more thereof may be used in combination. With respect to the amount of the ultraviolet absorber to be incorporated, it is preferred to incorporate the ultraviolet absorber in an amount of 0.0001-1 part by weight per 100 parts by weight of the mixture of the polycarbonate resin (A) and aromatic polycarbonate resin (B) to be used in the invention. The amount of the ultraviolet absorber to be incorporated is more preferably 0.0005-0.5 parts by weight, even more preferably 0.001-0.2 parts by weight. By incorporating an ultraviolet absorber in an amount within that range, the weather resistance of the resin composition and various molded articles can be improved while preventing the ultraviolet absorber from bleeding to the surfaces of the molded articles and from reducing the mechanical properties of the various molded articles.

<Hindered-Amine Light Stabilizer>

A hindered-amine light stabilizer can be incorporated for the purpose of further improving the weather resistance of the polycarbonate resin composition and polycarbonate resin molded articles of the invention. Examples of the hindered-amine light stabilizer include bis(2,2,6,6-tetramethyl-4-piperidyl)sebacate, bis(1,2,2,6,6-pentamethyl-4-piperidyl)sebacate, poly[[6-(1,1,3,3-tetramethylbutyl)amino-1,3,5-triazine-2,4-diyl][(2,2,6,6-tetramethyl-4-piperidyl)imino] hexamethylene[(2,2,6,6-tetramethyl-4-piperidyl)imino]], N,N'-bis(3-aminopropyl)ethylenediamine-2,4-bis[N-butyl-N-(1,2,2,6,6-pentamethyl-4-piperidylamino)-6-chloro-1,3, 5-triazine condensates, and polycondensates of dibutylamine, 1,3,5-triazine, or N,N'-bis(2,2,6,6)-tetramethyl-4-piperidyl-1,6-hexamethylenediamine with N-(2,2,6,6-tetramethyl-4-piperidyl)butylamine. Preferred of these are bis(2,2,6,6-tetramethyl-4-piperidyl)sebacate and bis(1,2,2,6, 6-pentamethyl-4-piperidyl)sebacate.

With respect to the amount of the hindered-amine light stabilizer to be incorporated, it is preferred to incorporate the hindered-amine light stabilizer in an amount of 0.001-1 part by weight per 100 parts by weight of the mixture of the polycarbonate resin (A) and aromatic polycarbonate resin (B) to be used in the invention. The amount of the hindered-amine light stabilizer to be incorporated is more preferably 0.005-0.5 parts by weight, especially preferably 0.01-0.2 parts by weight. By incorporating a hindered-amine light stabilizer in an amount within that range, the weather resistance of various molded articles obtained by molding the polycarbonate resin composition of the invention can be improved while preventing the hindered-amine light stabilizer from bleeding to the surface of the polycarbonate resin composition and from reducing the mechanical properties of the molded articles.

<Release Agent>

It is preferred that the polycarbonate resin composition of the invention should further contain a release agent from the standpoint that the composition shows further improved releasability from the mold during melt molding. Examples of the release agent include higher fatty acids, higher fatty acid esters of mono- or polyhydric alcohols, natural animal waxes such as bees wax, natural vegetable waxes such as carnauba wax, natural petroleum waxes such as paraffin wax, natural coal waxes such as montan wax, olefin waxes, silicone oils, and organopolysiloxanes. Especially preferred are higher fatty acids and higher fatty acid esters of mono- or polyhydric alcohols.

The higher fatty acid esters preferably are partial or complete esters of substituted or unsubstituted, mono- or polyhydric alcohols having 1-20 carbon atoms with substituted or unsubstituted, saturated fatty acids having 10-30 carbon atoms. Examples of the partial or complete esters of mono- or polyhydric alcohols with saturated fatty acids include stearic monoglyceride, stearic diglyceride, stearic triglyceride, stearic acid monosorbitate, stearyl stearate, behenic monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, 2-ethylhexyl stearate, and ethylene glycol distearate. Preferred of these are stearic monoglyceride, stearic triglyceride, pentaerythritol tetrastearate, and behenyl behenate.

The higher fatty acids preferably are substituted or unsubstituted, saturated fatty acids having 10-30 carbon atoms. Examples of such saturated fatty acids include myristic acid, lauric acid, palmitic acid, stearic acid, and behenic acid. One of these release agents may be used alone, or a mixture of two or more thereof may be used. The content of the release agent, per 100 parts by weight of the mixture of the polycarbonate resin (A) and aromatic polycarbonate resin (B) to be used in the invention, is preferably 0.0001 part by weight or more, more preferably 0.01 part by weight or more, especially preferably 0.1 part by weight or more, and is preferably 2 parts by weight or less, more preferably 1 part by weight or less, especially preferably 0.5 parts by weight or less.

The time at which the release agent is to be incorporated into the polycarbonate resin composition in this embodiment and methods for the addition are not particularly limited. Examples of the time of addition include the time when polymerization reaction is completed, in the case where a polycarbonate resin was produced by a transesterification method. Examples thereof further include, regardless of polymerization method: the time when a polycarbonate resin is in a molten state, for example, during kneading of the polycarbonate resin and other ingredients; and the time when a solidstate polycarbonate resin in the form of pellets, powder, or the like is blended with other ingredients and kneaded by means of an extruder or the like. Examples of addition methods include: a method in which the release agent is directly added, through mixing or kneading, to a polycarbonate resin; and a method in which the release agent is added in the form of a high-concentration master batch produced using a small amount of a polycarbonate resin, another resin, etc. and the release agent.

<Epoxy Compound>

Furthermore, an epoxy compound can be further incorporated into the polycarbonate resin composition (X) in order to further improve the hydrolytic resistance of the molded objects of the invention. Examples of the epoxy compound include epoxidized soybean oil, epoxidized linseed oil, phenyl glycidyl ether, allyl glycidyl ether, t-butylphenylglycidyl ether, 3,4-epoxycyclohexylmethyl 3',4'-epoxycyclohexylcarboxylate, 3,4-epoxy-6-methylcyclohexylmethyl 3',4'-epoxy-6'-methylcyclohexylcarboxylate, 2,3-epoxycyclohexylmethyl 3',4'-epoxycyclohexylcarboxylate, 4-(3,4-epoxy-5-methylcyclohexyl)butyl 3',4'-epoxycyclohexylcarboxylate, 3,4-epoxycyclohexylethylene oxide, cyclohexylmethyl 3,4-epoxycyclohexylcarboxylate, 3,4-epoxy-6-methylcyclohexylmethyl 6'-methylcyclohexylcarboxylate, bisphenol A diglycidyl ether, tetrabromobisphenol A glycidyl ether, the diglycidyl ester of phthalic acid, the diglycidyl ester of hexahydrophthalic acid, bisepoxydicyclopentadienyl ether, bisepoxyethylene glycol, bisepoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl 2,2-dimethyl-3,4-epoxycyclohexylcarboxylate, n-butyl 2,2-dimethyl-3,4-epoxycyclohexylcarboxylate, cyclohexyl 2-methyl-3,4-epoxycyclohexylcarboxylate, n-butyl 2-isopropyl-3,4-epoxy-5-methylcyclohexylcarboxylate, octadecyl 3,4-epoxycyclohexylcarboxylate, 2-ethylhexyl 3',4'-epoxycyclohexylcarboxylate, 4,6-dimethyl-2,3-epoxycyclohexyl 3',4'-epoxycyclohexylcarboxylate, 4,5-epoxytetrahydrophthalic anhydride, 3-t-butyl-4,5-epoxytetrahydrophthalic anhydride, diethyl 4,5-epoxy-cis-1,2-cyclohexyldicarboxylate, and di-n-butyl 3-t-butyl-4,5-epoxy-cis-1,2-cyclohexyldicarboxylate. Bisphenol A diglycidyl ether is preferred from the standpoints of compatibility, etc. With respect to the amount of the epoxy compound to be incorporated, the epoxy compound may be incorporated in a proportion of preferably 0.0001-5% by mass, more preferably 0.001-1% by mass, even more preferably 0.005-0.5% by mass, based on 100% by mass of the resin composition for constituting the molded objects of the invention. By incorporating an epoxy compound in an amount within that range, the hydrolytic resistance of the various molded objects can be improved while preventing the epoxy compound from bleeding to the surfaces of the molded objects and from reducing the mechanical properties of the molded articles.

Additives such as a plasticizer, pigment, dye, and filler can be further incorporated into the polycarbonate resin composition of the invention besides the ingredients described above.

<Notched Charpy Impact Strength>

The polycarbonate resin composition according to the invention has a notched Charpy impact strength as measured in accordance with ISO 179 (2000) of preferably 10 kJ/m$^2$ or higher, more preferably 12 kJ/m$^2$ or higher. In the case where the notched Charpy impact strength thereof is too low, the injection-molded article tends to readily break at the site where stress concentration occurs. The upper limit thereof is 200 kJ/m$^2$ when difficulties in attainment are taken into account.

<Molding>

The polycarbonate resin molded articles of the invention are obtained by molding the polycarbonate resin composition (X) described above. Methods of molding for obtaining the polycarbonate resin molded articles are not particularly limited. Examples thereof include: a method in which raw materials comprising the polycarbonate resin (A) and the aromatic polycarbonate resin (B) and optionally further comprising other resins, additives, etc. are directly mixed together and the mixture is introduced into an extruder or an injection molding machine and molded; and a method in which the raw materials are melt-mixed by means of a twin-screw extruder and extruded into strands to produce pellets and the pellets are introduced into an extruder or an injection molding machine and molded. In either method, it is necessary that the decrease in molecular weight of the polycarbonate resins which is caused by hydrolysis should be taken into account. For evenly mixing the raw materials, it is preferred to select the latter. The latter production process hence is explained below.

The polycarbonate resin (A) and the aromatic polycarbonate resin (B) and, according to need, other resins and additives are sufficiently dried to remove moisture. Thereafter, the ingredients are melt-mixed and extruded into a strand shape using a twin-screw extruder to produce pellets. It is preferred in this operation that a melt extrusion temperature should be suitably selected while taking account of, for example, the fact that the viscosity varies depending on the compositions and proportions of the raw materials. Specifically, the molding temperature is preferably 200-260° C., more preferably 210-250° C., even more preferably 220-240° C.

The pellets produced by the method are sufficiently dried to remove moisture. Thereafter, molding for producing a film, plate, or injection-molded article can be conducted by the following method.

As a molding method for forming a film and a plate, use can be made of, for example, the T-die casting method or the pressing method which are general techniques for film or plate formation, besides the roll stretching or tenter stretching method, tubular method, or inflation method.

The term "film" generally means a thin flat product which has an extremely small thickness as compared with the length and width thereof, the maximum thickness having been limited to any value, and which usually is supplied in the form of a roll (JIS K6900 (1994)), while the term "sheet", in accordance with the definition given in JIS, generally means a thin flat product in which the thickness is small for the length and width thereof. However, the boundary between sheet and film is uncertain, and there is no need of making a distinction between the two by word in the invention. Consequently, in the invention, the term "film" includes a "sheet" also and the term "sheet" includes a "film" also.

Molding methods for obtaining an injection-molded object are not particularly limited. For example, use can be made of injection-molding techniques such as general injection molding techniques for thermoplastic resins, gas-assisted molding, and injection compression molding. Besides these, other methods such as in-mold molding, gas pressing molding, two-color molding, and sandwich molding can be employed according to purposes.

<Transparency>

It is preferred that the polycarbonate resin composition of the invention should be transparent, depending on the properties required in the intended application thereof. The transparency thereof can be evaluated, for example, based on the total light transmittance of a molded object formed therefrom. The polycarbonate resin composition having a high total light transmittance is preferred. The total light transmittance of the polycarbonate resin composition of the invention, which is determined by examining a molded object (thickness, 3 mm) formed from the composition, is preferably 60% or higher, more preferably 70% or higher, especially preferably 80% or higher.

The total light transmittance, as measured in accordance with JIS K7361-1 (1997), of the molded object having a thickness of 1 mm is preferably 80% or higher, more preferably 83% or higher, even more preferably 85% or higher. This molded object further has a haze, as measured in accordance with JIS K7105 (1981), of preferably 5% or less, more preferably 4% or less, even more preferably 3% or less. When the total light transmittance and haze of the resin composition are within those ranges, the resin composition can be extensively used in various applications where transparency is required.

In the case where this resin composition is molded into a thickness of 0.2 mm, the total light transmittance of the molded object, as measured in accordance with JIS K7361-1 (1997), is preferably 80% or higher, more preferably 83% or higher, even more preferably 85% or higher. This molded object further has a haze, as measured in accordance with JIS K7105 (1981), of preferably 3% or less, more preferably 2% or less, even more preferably 1.8% or less, especially preferably 1.5% or less. When the total light transmittance and haze of the resin composition are within those ranges, the resin composition can be extensively used in various applications where transparency is required.

<Weather Resistance>

The polycarbonate resin composition of the invention has high weather resistance. The weather resistance thereof can be evaluated, for example, through an irradiation treatment with a sunshine carbon arc lamp. More specifically, using a specific apparatus, specific filter, etc. as will be described later and using a sunshine carbon arc lamp at a discharge voltage of 50 V and a discharge current of 60 A, a sample is irradiated for 500 hours with light mainly having wavelengths of 300-1,100 nm at a black panel temperature of 63° C. in an environment having a relative humidity of 50% and a rainfall spray period per hour of 12 minutes. The weather resistance of the composition can be thus evaluated.

After the molded object (thickness, 3 mm) formed from the polycarbonate resin composition of the invention has been irradiated with light for 500 hours using the sunshine carbon arc lamp, the total light transmittance thereof is preferably 85% or higher. The upper limit thereof is 99% or less. Furthermore, the difference in yellowness index (YI) value between before and after the irradiation treatment is preferably 10 or less, more preferably 8 or less, especially preferably 6 or less.

Furthermore, it is important that the molded object of the invention should have a photoelastic coefficient, as measured with light having a wavelength of 600 nm, of $7 \times 10^{-11}$ $Pa^{-1}$ or less. The photoelastic coefficient thereof is more preferably $6.5 \times 10^{-11}$ $Pa^{-1}$ or less, even more preferably $6 \times 10^{-11}$ $Pa^{-1}$ or less. When the photoelastic coefficient thereof is within that range, a phase difference due to stress is less apt to arise and the resin composition can be extensively used in optical applications including various lenses.

It is also preferred that the resin composition of the invention should give an injection-molded article which has a total light transmittance, as measured in accordance with JIS K7105 (1981) using a hazemeter and illuminant D65, of 60% or higher.

The film, plate, or injection-molded article obtained from the resin composition of the invention is excellent in transparency and mechanical properties such as impact resistance and strength or elongation at rupture and further has excellent heat resistance and flowability. Consequently, although applications of the resin composition of the invention are not particularly limited, the resin composition can be used, for example, in applications such as building materials, interior parts, transparent sheets, sheets for resin-coated metal sheets, sheets for forming (e.g., vacuum/air-pressure forming or hot-press forming), colored plates, transparent plates, shrink films, shrink labels, shrink tubes, and injection-molded articles such as automotive interior materials, housings for domestic electrical appliances, various parts, and parts for OA apparatus.

The molded objects of the invention have a low photoelastic coefficient and are excellent in transparency, heat resistance, and impact resistance. Although applications thereof are not particularly limited, the molded objects can hence be used, for example, as various lenses including camera lenses for cell phones and pickup lenses for optical disks, lightguide plates for liquid-crystal displays, various optical films/sheets, optical disks, capacitor films, and the like. Furthermore, since the polycarbonate resin molded articles of the invention are excellent in light resistance and transparency, the molded articles can be used as noise insulation walls for roads, arcade ceiling sheets, arcade ceiling plates, roofing materials for facilities, wall materials for facilities, and the like.

EXAMPLES

The invention will be explained below in more detail by reference to Examples. However, the invention should not be construed as being limited by the following Examples unless the invention departs from the spirit thereof.

Examples 1-1 to 1-3 and Comparative Examples 1-1 to 1-4

In the following, properties of polycarbonate resins, polycarbonate resin compositions, molded articles, etc. were evaluated by the following methods.

(1) Measurement of Reduced Viscosity

A sample of a polycarbonate resin was dissolved using methylene chloride as a solvent to prepare a polycarbonate solution having a concentration of 0.6 g/dL. Using an Ubbelohde viscometer manufactured by Moritomo Rika Kogyo, a measurement was made at a temperature of 20.0±0.1° C. The relative viscosity $\eta_{rel}$ was determined from the flow-down time of the solvent $t_0$ and the flow-down time of the solution t using the following equation.

$$\eta_{rel} = t/t_0$$

The specific viscosity $\eta sp$ was determined from the relative viscosity using the following equation.

$$\eta_{sp} = (\eta - \eta_0)/\eta_0 = \eta_{rel} - 1$$

The specific viscosity was divided by the concentration c (g/dL) to determine the reduced viscosity $\eta_{sp}/c$. The larger the value thereof, the higher the molecular weight.

(2) Measurement of Total Light Transmittance

In accordance with JIS K7105 (1981), an injection-molded piece was examined for total light transmittance using a hazemeter (NDH2000, manufactured by Nippon Denshoku Kogyo K.K.) and illuminant D65.

(3) Tensile Test

A tensile test was conducted in accordance with ISO 527 (1993) to measure the nominal strain at rupture.

(4) Deflection Temperature Under Load

Deflection temperature under load was measured under a load of 1.80 MPa in accordance with ISO 75 (2004).

<Polycarbonate Resin (A)>

PC1:
(Constitutional units derived from isosorbide)/(constitutional units derived from 1,4-cyclohexanedimethanol)=40/60 mol %; reduced viscosity, 0.63 dL/g PC2:
(Constitutional units derived from isosorbide)/(constitutional units derived from 1,4-cyclohexanedimethanol)=70/30 mol %; reduced viscosity, 0.51 dL/g <Aromatic Polycarbonate Resin (B)>

PC3:
Novarex M7027BF, manufactured by Mitsubishi Engineering-Plastics Corp.; reduced viscosity, 0.56 dL/g PC4:
Novarex 7022J, manufactured by Mitsubishi Engineering-Plastics Corp.; reduced viscosity, 0.47 dL/g Example 1-1

PC1 was dry-blended with PC3 in a mass ratio of 80:20, and the mixture was extruded at a resin temperature of 250° C. using a twin-screw extruder (TEX30HSS-32) manufactured by The Japan Steel Works, Ltd. The extrudate was solidified by cooling with water and then pelletized with a rotary cutter. The pellets were dried at 80° C. for 10 hours in a nitrogen atmosphere and subsequently fed to an injection molding machine (Type J75EII, manufactured by The Japan Steel Works, Ltd.) to mold injection-molded plates (60 mm (width)×60 mm (length)×3 mm (thickness)) and ISO test pieces for property measurements, under the conditions of a resin temperature of 250° C., a mold temperature of 60° C., and a molding cycle of 40 seconds.

The samples obtained were subjected to the measurement of total light transmittance, tensile test, and measurement of deflection temperature under load. The results thereof are shown in Table 1.

Example 1-2

Sample production and evaluation were conduced in the same manners as in Example 1-1, except that PC1 and PC3 were mixed in a mass ratio of 60:40. The results obtained are shown in Table 1.

Example 1-3

Sample production and evaluation were conduced in the same manners as in Example 1-1, except that PC1 and PC3 were mixed in a mass ratio of 40:60. The results obtained are shown in Table 1.

Comparative Example 1-1

Sample production and evaluation were conduced in the same manners as in Example 1-1, except that PC2 and PC4 were mixed in a mass ratio of 60:40. The results obtained are shown in Table 1.

Comparative Example 1-2

Sample production and evaluation were conduced in the same manners as in Example 1-1, except that PC2 and PC3 were mixed in a mass ratio of 60:40. The results obtained are shown in Table 1.

Comparative Example 1-3

The same evaluation as in Example 1-1 was conducted, except that PC1 only was dried at 70° C. for 6 hours in a nitrogen atmosphere and then molded. The results obtained are shown in Table 1.

Comparative Example 1-4

The same evaluation as in Example 1-1 was conducted, except that PC2 only was dried at 80° C. for 6 hours in a nitrogen atmosphere and then molded. The results obtained are shown in Table 1.

TABLE 1

Component proportions by weight and properties of polycarbonate resin compositions

| | | Example 1-1 | Example 1-2 | Example 1-3 | Comparative Example 1-1 | Comparative Example 1-2 | Comparative Example 1-3 | Comparative Example 1-4 |
|---|---|---|---|---|---|---|---|---|
| Polycarbonate resin (A) | PC1 | 80 | 60 | 40 | — | — | 100 | — |
| | PC2 | — | — | — | 60 | 60 | — | 100 |
| Aromatic polycarbonate resin (B) | PC3 | 20 | 40 | 60 | — | 40 | — | — |
| | PC4 | — | — | — | 40 | — | — | — |
| Total light transmittance (%) | | 89 | 89 | 87 | 5 | 5 | 90 | 91 |
| Nominal strain at rupture (%) | | 131 | 127 | 96 | 60 | 80 | 122 | 70 |
| Deflection temperature under load [1.80 MPa] (° C.) | | 82 | 89 | 100 | 116 | 117 | 71 | 105 |

In Table 1, "—" indicates that the material was not used.

The results show that the polycarbonate resin compositions of the invention each are a composition which has a nominal strain at rupture as high as above 80% and simultaneously has a deflection temperature under load as high as 75° C. [1.80 MPa] or above. The compositions hence have excellent mechanical strength. Besides having these properties, the polycarbonate resin compositions further have a total light transmittance as high as 60% or above.

Examples 2-1 to 2-5 and Comparative Examples 2-1 to 2-4

Various measurements and evaluation of raw materials and test pieces shown in the description were conducted in the following manners. Here, the direction of flow from the film extruder is called the machine direction, and the direction perpendicular thereto is called the transverse direction.

(1) Viscosity-Average Molecular Weight (Mv)

A methylene chloride solution of a polycarbonate resin sample (0.6 g/dL) was prepared, and the $\eta_{sp}$ at 20° C. thereof was measured using an Ubbelohde viscometer. The viscosity-average molecular weight (Mv) was determined using the following equations (I) and (II).

$$\eta_{sp}/C=[\eta]\times(1+0.28\eta_{sp}) \quad (I)$$

$$[\eta]=1.23\times10^{-4}\times(Mv)^{0.83} \quad (II)$$

(In equation (1), $\eta_{sp}$ is the specific viscosity of the polycarbonate resin sample measured in methylene chloride at 20° C., and C is the concentration of the methylene chloride solution. As the methylene chloride solution is used a solution in which the concentration of the polycarbonate resin sample is 0.6 g/dL.)

(2) Reduced Viscosity

Using automatic viscometer Type DT-504, manufactured by Chuo Rika Corp., which employed an Ubbelohde viscometer, the reduced viscosity of a polycarbonate resin sample was measured at a temperature of 20.0±0.1° C. using methylene chloride as a solvent. The concentration thereof was precisely adjusted to 0.60 g/dL before the measurement.

The relative viscosity $\eta_{rel}$ was determined from the flow-down time of the solvent $t_0$ and the flow-down time of the solution t using the following equation.

$$\eta_{rel}=t/t_0$$

From the relative viscosity $\eta_{rel}$, the specific viscosity $\eta_{sp}$ was determined using the following equation.

$$\eta_{sp}=(\eta-\eta_0)/\eta_0=\eta_{rel}-1$$

The specific viscosity $\eta_{sp}$ was divided by the concentration c (g/dL) to determine the reduced viscosity $\eta_{red}$ using the following equation.

$$\eta_{red}=\eta_{sp}/c$$

The larger the value thereof, the higher the molecular weight.

(3) Glass Transition Temperature

Using viscoelasticity spectrometer DVA-200 (manufactured by IT Keisoku Seigyo K.K.), the temperature dispersion of dynamic viscoelasticity was examined under the conditions of a strain of 0.1%, frequency of 10 Hz, and heating rate of 3° C./min (dynamic viscoelasticity measurement as provided for in JIS K7198 method A (1991)). The temperature which indicated the main dispersion peak of loss tangent (tan δ) was taken as the glass transition temperature.

(4) Photoelastic Coefficient

KOBRA-WR, manufactured by Oji Scientific Instruments, was used. A sample having a width of 15 mm, length of 60 mm, and thickness of 0.2 mm was set so that the slow axis was parallel to the pulling direction. The tensile load was increased by 50 gf at a time, and the resultant changes in phase retardation were measured. The results were approximated to a straight line, and the slope thereof was calculated. Subsequently, the photoelastic coefficient was calculated using the following equation.

$$\text{Photoelastic coefficient}=[\text{slope}]\times1.5\times10^{-8}/9.8 \, (Pa^{-1})$$

Photoelastic coefficients of $7\times10^{-11}$ $Pa^{-1}$ or less were regarded as acceptable.

(5) Total Light Transmittance and Haze

In accordance with JIS K7105 (1981), total light transmittance and diffuse transmittance were measured, and haze was calculated using the following equation. Samples which, when having a thickness of 1 mm, had a total light transmittance of 80% or higher and a haze of 5% or less were rated as acceptable.

$$\text{Haze}=[\text{diffuse transmittance}]/[\text{total light transmittance}]\times100$$

(6) Impact Resistance (Izod Impact Strength)

In accordance with JIS K-7110 (1999), test pieces of No. 2, A (notched; 64 mm (length)×12.7 mm (width)×4 mm (thickness)) were produced and examined for Izod impact strength at 23° C. with JISL-D, manufactured by Toyo Seiki Seisaku-Sho, Ltd. Samples having an Izod impact strength of 15 kJ/m² or higher were rated as acceptable.

(7) Heat Resistance (Deflection Temperature Under Load)

In accordance with JIS K-7191 method A (2007), test pieces having a length of 80 mm, width of 10 mm, and thickness of 4 mm were produced and examined for deflection temperature under load with S-3M, manufactured by Toyo Seiki Seisaku-Sho, Ltd. The measurement was made along the flatwise direction under the conditions of a bending stress to be applied to each test piece of 0.45 MPa. Samples having a deflection temperature under load of 70° C. or higher were rated as acceptable.

[Polycarbonate Resin (A)]

PC1:
(Structural units derived from isosorbide)/(structural units derived from 1,4-cyclohexanedimethanol)=30/70 mol %; glass transition temperature=80° C.; reduced viscosity, 0.69 dL/g PC2:
(Structural units derived from isosorbide)/(structural units derived from 1,4-cyclohexanedimethanol)=40/60 mol %; glass transition temperature=90° C.; reduced viscosity, 0.69 dL/g PC3:
(Structural units derived from isosorbide)/(structural units derived from 1,4-cyclohexanedimethanol)=50/50 mol %; glass transition temperature=101° C.; reduced viscosity, 0.57 dL/g PC4:
(Structural units derived from isosorbide)/(structural units derived from 1,4-cyclohexanedimethanol)=60/40 mol %; glass transition temperature=110° C.; reduced viscosity, 0.51 dL/g PC5:
(Structural units derived from isosorbide)/(structural units derived from tricyclodecanedimethanol)=50/50 mol %; glass transition temperature=110° C.; reduced viscosity, 0.60 dL/g

[Aromatic Polycarbonate Resin (B)]

PC6: Iupilon S3000, manufactured by Mitsubishi Engineering-Plastics Corp.
glass transition temperature=150° C.; reduced viscosity, 0.49 dL/g; viscosity-average molecular weight=20,000

Example 2-1

PC1 and PC6 were dry-blended in a mass ratio of 90:10 and then compounded at 240° C. by means of a 40-mmϕ compact corotating twin-screw extruder manufactured by Mitsubishi Heavy Industries, Ltd., and the resultant composition was formed into pellets. Using injection-molding machine IS50E (screw diameter, 25 mm), manufactured by Toshiba Machine Co., Ltd., samples for the various kinds of evaluation were produced from the resultant pellets by injection molding. Major molding conditions were as follows.

1) Temperature conditions: cylinder temperature, 240° C.; mold temperature, 6° C.
2) Injection conditions: injection pressure, 115 MPa; holding pressure, 55 MPa
3) Metering conditions: screw rotation speed, 65 rpm; back pressure, 15 MPa The samples obtained were examined for glass transition temperature, photoelastic coefficient, total light transmittance, haze, Izod impact strength, and deflection temperature under load. The results thereof are shown in Table 2.

Example 2-2

Sample production and evaluation were conducted in the same manners as in Example 2-1, except that PC1 and PC6 were mixed in a mass ratio of 60:40. The results obtained are shown in Table 2.

Example 2-3

Sample production and evaluation were conducted in the same manners as in Example 2-1, except that PC1 and PC6 were mixed in a mass ratio of 30:70. The results obtained are shown in Table 2.

Example 2-4

Sample production and evaluation were conducted in the same manners as in Example 2-1, except that PC2 and PC6 were mixed in a mass ratio of 60:40. The results obtained are shown in Table 2.

Example 2-5

Sample production and evaluation were conducted in the same manners as in Example 2-1, except that PC3 and PC6 were mixed in a mass ratio of 60:40. The results obtained are shown in Table 2.

Comparative Example 2-1

Sample production and evaluation were conducted in the same manners as in Example 2-1, except that the polycarbonate resin (A) was omitted and PC6 was used alone and that the mold temperature was changed to 100° C. The results obtained are shown in Table 2.

Comparative Example 2-2

Sample production and evaluation were conducted in the same manners as in Example 2-1, except that PC4 and PC6 were mixed in a mass ratio of 60:40. The results obtained are shown in Table 2.

Comparative Example 2-3

Sample production and evaluation were conducted in the same manners as in Example 2-1, except that PC5 and PC6 were mixed in a mass ratio of 60:40. The results obtained are shown in Table 2.

Comparative Example 2-4

Sample production and evaluation were conducted in the same manners as in Example 2-1, except that PCTG 24635 (poly(1,4-cyclohexylenedimethylene terephthalate)glycol), manufactured by Eastman Chemical Ltd., was used in place of the polycarbonate resin (A) and that PCTG 24635 and PC6 were mixed in a mass ratio of 60:40. The results obtained are shown in Table 2.

TABLE 2

Component proportions by weight and properties of polycarbonate resin compositions

| | | Example | | | | | Comparative Example | | | |
|---|---|---|---|---|---|---|---|---|---|---|
| | | 2-1 | 2-2 | 2-3 | 2-4 | 2-5 | 2-1 | 2-2 | 2-3 | 2-4 |
| (A) | PC1 | 90 | 60 | 30 | — | — | — | — | — | — |
| | PC2 | — | — | — | 60 | — | — | — | — | — |
| | PC3 | — | — | — | — | 60 | — | — | — | — |
| | PC4 | — | — | — | — | — | — | 60 | — | — |
| | PC5 | — | — | — | — | — | — | — | 60 | — |
| (B) | PC6 | 10 | 40 | 70 | 40 | 40 | 100 | 40 | 40 | 40 |
| Polyester | PCTG 24635 | — | — | — | — | — | — | — | — | 60 |
| Glass transition temperature (° C.) | | 86 | 109 | 130 | 110 | 120 | 150 | 110 142 | 110 148 | 114 |
| Photoelastic coefficient ($\times 10^{-11}$ Pa$^{-1}$) | | 4.3 | 5.7 | 6.7 | 5.2 | 4.9 | 8.2 | 7.9 | 7.8 | 11.2 |
| Total light transmittance (%) | | 91 | 90 | 89 | 89 | 89 | 87 | 64 | 60 | 89 |
| Haze (%) | | 1.4 | 1.6 | 2.5 | 1.8 | 0.4 | 2.8 | 67.2 | 69.2 | 2.5 |
| Izod impact strength (kJ/m$^2$) | | 98 | 88 | 75 | 21 | 18 | 68 | 12 | 9 | 10 |
| Deflection temperature under load (° C.) | | 74 | 108 | 134 | 114 | 125 | 154 | 125 | 118 | 118 |

In Table 2, "—" indicates that the material was not used.

Table 2 shows that the molded objects of the invention had a low photoelastic coefficient so long as the molded objects were within the range specified in the invention, and were excellent also in transparency, heat resistance, and impact resistance. In contrast, the Comparative Examples each had an increased photoelastic coefficient. Furthermore, Comparative Examples 2-2 and 2-3 were inferior in transparency to the Examples, and Comparative Examples 2-2 to 2-4 were inferior in impact resistance to the Examples. It can hence be seen that the molded objects of the invention are molded objects which have a low photoelastic coefficient and are excellent in transparency, heat resistance, and impact resistance.

Examples 3-1 to 3-5 and Comparative Examples 3-1 to 3-3

Various measurements and evaluation of raw materials and test pieces shown in the description were conducted in the following manners. Here, the direction of flow from the film extruder is called the machine direction, and the direction perpendicular thereto is called the transverse direction.

(1) Viscosity-Average Molecular Weight (Mv)

A methylene chloride solution of a polycarbonate resin sample (0.6 g/dL) was prepared, and the $\eta_{sp}$ at 20° C. thereof was measured using an Ubbelohde viscometer. The viscosity-average molecular weight (Mv) was determined using the following equations (I) and (II).

$$\eta_{sp}/C=[\eta]\times(1+0.28\eta_{sp}) \quad (I)$$

$$[\eta]=1.23\times10^{-4}\times(Mv)^{0.83} \quad (II)$$

(In equation (1), $\eta_{sp}$ is the specific viscosity of the polycarbonate resin sample measured in methylene chloride at 20° C., and C is the concentration of the methylene chloride solution. As the methylene chloride solution is used a solution in which the concentration of the polycarbonate resin sample is 0.6 g/dL.)

(2) Reduced Viscosity

Using automatic viscometer Type DT-504, manufactured by Chuo Rika Corp., which employed an Ubbelohde viscometer, the reduced viscosity of a polycarbonate resin sample was measured at a temperature of 20.0±0.1° C. using methylene chloride as a solvent. The concentration thereof was precisely adjusted to 0.60 g/dL before the measurement.

The relative viscosity $\eta_{rel}$ was determined from the flow-down time of the solvent $t_0$ and the flow-down time of the solution t using the following equation.

$$\eta_{rel}=t/t_0$$

From the relative viscosity $\eta_{rel}$, the specific viscosity $\eta_{sp}$ was determined using the following equation.

$$\eta_{sp}=(\eta-\eta_0)/\eta_0=\eta_{rel}-1$$

The specific viscosity $\eta_{sp}$ was divided by the concentration c (g/dL) to determine the reduced viscosity $\eta_{red}$ using the following equation.

$$\eta_{red}=\eta_{sp}/c$$

The larger the value thereof, the higher the molecular weight.

(3) Glass Transition Temperature

A differential scanning calorimeter ("DSC 822", manufactured by Mettler Inc.) was used to make a measurement in which about 10 mg of a sample was heated at a heating rate of 10° C./min. In accordance with JIS K7121 (1987), an extrapolated glass transition initiation temperature (Tig) was determined, the Tig being the temperature corresponding to the intersection of the straight line drawn by extending the lower-temperature-side base line toward the higher-temperature side and the tangent which touched the step-wise changing portion of the curve, which was due to a glass transition, at the point where the curve had a maximum slope.

(4) Total Light Transmittance and Haze

In accordance with JIS K7105 (1981), total light transmittance and diffuse transmittance were measured, and haze was calculated using the following equation. Samples which, when having a thickness of 0.2 mm, had a total light transmittance of 80% or higher and a haze of 3% or less were rated as acceptable.

Haze=[diffuse transmittance]/[total light transmittance]×100

(5) Tensile Strength/Elongation at Rupture

In accordance with JIS K7127 (1999), test pieces having a length of 120 mm, width of 10 mm, and thickness of 0.2 mm were produced so that the transverse direction was the measurement direction, and were examined for tensile strength/elongation at rupture using universal testing machine MODEL 205, manufactured by Intesco Co., Ltd., under the conditions of a temperature of 23° C. and a test speed of 200 mm/min. Samples having a tensile strength at rupture of 50 MPa or higher and a tensile elongation at rupture of 100% or more were rated as acceptable.

(6) Tensile Modulus

In accordance with JIS K7127 (1999), test pieces having a length of 400 mm, width of 10 mm, and thickness of 0.2 mm were produced so that the transverse direction was the measurement direction, and were examined for tensile modulus using universal testing machine MODEL 205, manufactured by Intesco Co., Ltd., under the conditions of a temperature of 23° C. and a pulling rate of 5 mm/min. Tensile moduli of 2.0 GPa or higher were regarded as acceptable.

(7) Impact Resistance (Breaking Energy)

A hydro-shot high-speed impact tester ("Type HTM-1", manufactured by Shimadzu Corp.) was used. A sheet which had been cut out so as to have a size of 100 mm (machine direction)×100 mm (transverse direction) was used as a sample and fixed with a clamp. At a temperature of 23° C., an impactor having a diameter of ½ inch was dropped onto the center of the sheet at a drop speed of 3 msec to impact on the sheet, and the breaking energy (kgf·mm) required for the sample to break was measured. Samples having a breaking energy of 100 kgf·mm or more were rated as acceptable.

(8) Heat Resistance (TMA Softening Temperature)

Samples for evaluation having a length of 5 mm and a width of 5 mm (the thickness varied from test piece to test piece) were subjected to a softening temperature measurement by TMA in accordance with JIS K7196 (1991). A TMA curve was obtained under the conditions of a temperature of 23° C., relative humidity of 50%, pressure applied to the indenter of 0.5 N, and heating rate of 5° C./min. The intersection of a higher-temperature-side extension of the linear portion which appeared on the lower-temperature side than the temperature at which the indenter began to penetrate and a lower-temperature-side extension of the tangent to the portion where the rate of penetration was maximum was taken as a needle penetration temperature. From the value thereof, the softening temperature was calculated. TMA softening temperatures of 70° C. or higher were regarded as acceptable.

(9) Flowability (Viscosity)

Using "Koka Flow Tester Type CFT-500C", manufactured by Shimadzu Corp., melt viscosity was measured at a temperature of 200° C. and a shear rate of 100 sec$^{-1}$ using a nozzle having an inner diameter of 1 mm and a length of 2 mm.

Samples having a viscosity as measured at 200° C. and 100 sec$^{-1}$ of 1,000-20,000 Pa·s were rated as acceptable.

(10) Overall Evaluation

The evaluation items were comprehensively taken into account to evaluate each of the Examples and Comparative Examples on the basis of the following four criteria.

A: A sample which has a single glass transition temperature and is acceptable with respect to all of total light transmittance, haze, tensile strength/elongation at rupture, tensile modulus, impact resistance, heat resistance, and flowability.

B: A sample which has a single glass transition temperature and which is acceptable with respect to all of total light transmittance, haze, tensile strength/elongation at rupture, tensile modulus, impact resistance, heat resistance, and flowability but is slightly inferior in flowability (10,000 Pa·s or higher).

C: A sample which has a single glass transition temperature and is acceptable with respect to total light transmittance, haze, tensile strength/elongation at rupture, impact resistance, heat resistance, and flowability and which is inferior in tensile modulus but is not on a practically problematic level.

D: A sample which does not have a single glass transition temperature or is not acceptable with respect to one or more of total light transmittance, haze, tensile strength/elongation at rupture, tensile modulus, impact resistance, heat resistance, and flowability, and which is on a practically problematic level.

[Polycarbonate Resin (A)]

PC1:
(Structural units derived from isosorbide)/(structural units derived from 1,4-cyclohexanedimethanol)=30/70 mol %;
glass transition temperature=80° C.; reduced viscosity, 0.69 dL/g PC2:
(Structural units derived from isosorbide)/(structural units derived from 1,4-cyclohexanedimethanol)=50/50 mol %;
glass transition temperature=101° C.; reduced viscosity, 0.57 dL/g PC3:
(Structural units derived from isosorbide)/(structural units derived from 1,4-cyclohexanedimethanol)=60/40 mol %;
glass transition temperature=110° C.; reduced viscosity, 0.51 dL/g PC4:
(Structural units derived from isosorbide)/(structural units derived from 1,4-cyclohexanedimethanol)=10/90 mol %;
glass transition temperature=50° C.; reduced viscosity, 0.51 dL/g PC5:
(Structural units derived from isosorbide)/(structural units derived from tricyclodecanedimethanol)=50/50 mol %;
glass transition temperature=110° C.; reduced viscosity, 0.60 dL/g

[Aromatic Polycarbonate Resin (B)]

PC6: Iupilon S3000, manufactured by Mitsubishi Engineering-Plastics Corp.
glass transition temperature=150° C.; reduced viscosity, 0.49 dL/g; viscosity-average molecular weight=20,000

Example 3-1

PC1 and PC6 were dry-blended in a mass ratio of 90:10, subsequently kneaded at 220° C. by means of a 40-mmφ corotating twin-screw extruder, and then extruded through a T-die. Subsequently, the extrudate was rapidly cooled with an about 80° C. casting roll to produce a sheet having a thickness of 0.2 mm. The sheet obtained was evaluated for glass transition temperature, tensile strength/elongation at rupture, tensile modulus, impact resistance, heat resistance, and flowability. The results thereof are shown in Table 3.

Example 3-2

Sheet production and evaluation were conducted in the same manners as in Example 3-1, except that PC1 and PC6 were mixed in a mass ratio of 60:40 and the casting roll temperature was changed to 100° C. The results obtained are shown in Table 3.

Example 3-3

Sheet production and evaluation were conducted in the same manners as in Example 3-1, except that PC1 and PC6 were mixed in a mass ratio of 20:80 and the casting roll temperature was changed to 130° C. The results obtained are shown in Table 3.

Example 3-4

Sheet production and evaluation were conducted in the same manners as in Example 3-1, except that PC2 and PC6 were mixed in a mass ratio of 60:40 and the casting roll temperature was changed to 120° C. The results obtained are shown in Table 3.

Comparative Example 3-1

Sheet production and evaluation were conducted in the same manners as in Example 3-1, except that PC3 and PC6 were mixed in a mass ratio of 60:40 and the casting roll temperature was changed to 120° C. The results obtained are shown in Table 3.

Example 3-5

Sheet production and evaluation were conducted in the same manners as in Example 3-1, except that PC4 and PC6 were mixed in a mass ratio of 60:40 and the casting roll temperature was changed to 110° C. The results obtained are shown in Table 3.

Comparative Example 3-2

Sheet production and evaluation were conducted in the same manners as in Example 3-1, except that the polycarbonate resin was omitted and PC6 was used alone, and that the casting roll temperature was changed to 130° C. The results obtained are shown in Table 3.

Comparative Example 3-3

Sheet production and evaluation were conducted in the same manners as in Example 3-1, except that PC5 and PC6 were mixed in a mass ratio of 60:40 and the casting roll temperature was changed to 100° C. The results obtained are shown in Table 3.

TABLE 3

Component proportions by weight and properties of polycarbonate resin compositions

|   |   | Example 3-1 | Example 3-2 | Example 3-3 | Example 3-4 | Comparative Example 3-1 | Example 3-5 | Comparative Example 3-2 | Comparative Example 3-3 |
|---|---|---|---|---|---|---|---|---|---|
| (A) | PC1 | 90 | 60 | 20 | — | — | — | — | — |
|   | PC2 | — | — | — | 60 | — | — | — | — |
|   | PC3 | — | — | — | — | 60 | — | — | — |
|   | PC4 | — | — | — | — | — | 60 | — | — |
|   | PC5 | — | — | — | — | — | — | — | 60 |
| (B) | PC6 | 10 | 40 | 80 | 40 | 40 | 40 | 100 | 40 |
| Glass transition temperature (° C.) | | 86 | 109 | 136 | 120 | 110 142 | 93 | 150 | 110 148 |
| Total light transmittance (%) | | 92 | 92 | 91 | 92 | 78 | 92 | 90 | 68 |
| Haze (%) | | 0.4 | 0.6 | 1.7 | 0.4 | 56.2 | 0.4 | 1.3 | 63.1 |
| Tensile strength at rupture (MPa) | | 54 | 58 | 62 | 58 | 67 | 54 | 61 | 71 |
| Tensile elongation at rupture (%) | | 146 | 132 | 128 | 118 | 68 | 182 | 126 | 12 |
| Tensile modulus (GPa) | | 2.1 | 2.2 | 2.3 | 2.3 | 2.8 | 1.8 | 2.2 | 3 |
| Breaking energy (kgf · mm) | | 512 | 493 | 465 | 385 | 86 | 642 | 452 | 46 |
| TMA softening temperature (° C.) | | 74 | 96 | 132 | 114 | 121 | 85 | 152 | 114 |
| Viscosity (Pa · s) | | 6,300 | 8,500 | 12,200 | 7,200 | 7,400 | 7,500 | 28,000 | 8,200 |
| Overall evaluation | | A | A | B | A | D | C | D | D |

In Table 3, "—" indicates that the material was not used.

Table 3 shows that the resin compositions of the invention were excellent in transparency, heat resistance, impact resistance, and flowability so long as the resin compositions were within the range specified in the invention. In particular, Examples 3-1, 3-2, and 3-4 were superior in flowability to Example 3-3 and were superior in rigidity to Example 3-5. In contrast, Comparative Example 3-1 and Comparative Example 3-3 were inferior in transparency and impact resistance to the Examples, and Comparative Example 3-2 was inferior in flowability to the Examples. It can hence be seen that the resin composition of the invention are resin compositions which are excellent in transparency, heat resistance, impact resistance, and flowability.

While the invention has been described in detail and with reference to specific embodiments thereof, it will be apparent to one skilled in the art that various changes and modifications can be made therein without departing from the spirit and scope thereof. This application is based on a Japanese patent application filed on Dec. 10, 2009 (Application No. 2009-280865), a Japanese patent application filed on Dec. 18, 2009 (Application No. 2009-288107), and a Japanese patent application filed on Aug. 20, 2010 (Application No. 2010-185058), the contents thereof being incorporated herein by reference.

The invention claimed is:

1. A polycarbonate resin composition (X) which comprises a polycarbonate resin (A) and an aromatic polycarbonate resin (B), the polycarbonate resin (A) comprising a constitutional unit derived from a dihydroxy compound (a) having, as part of the structure thereof, a site represented by the following formula (1) and a constitutional unit derived from a dihydroxy compound (b) of an aliphatic hydrocarbon, wherein the proportion of the constitutional unit derived from the dihydroxy compound (b) of an aliphatic hydrocarbon based on all constitutional units each derived from a dihydroxy compound in the polycarbonate resin (A) is 45% by mole or more,

[Chem. 1]

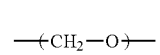

(1)

wherein the site represented by the formula (1) as part of —$CH_2$—O—H is excluded, and wherein the polycarbonate resin composition (X) has a single glass transition temperature and the glass transition temperature is not lower than the glass transition temperature of the polycarbonate resin (A) and not higher than the glass transition temperature of the aromatic polycarbonate resin (B).

2. The polycarbonate resin composition as claimed in claim 1, wherein a molded object having a thickness of 3 mm formed from the polycarbonate resin composition has a total light transmittance of 85% or higher after having undergone a 500-hour irradiation treatment with a sunshine carbon arc lamp at a discharge voltage of 50 V and a discharge current of 60 A at a black panel temperature of 63° C. in an environment having a relative humidity of 50% and a rainfall spray period per hour of 12 minutes, and the molded object has a difference in yellowness index (YI) value between before and after the irradiation treatment of 10 or less.

3. The polycarbonate resin composition as claimed in claim 1, wherein the glass transition temperature of the polycarbonate resin (A) is 75-105° C.

4. The polycarbonate resin composition as claimed in claim 1, wherein the glass transition temperature of the polycarbonate resin composition (X) is 75-130° C.

5. The polycarbonate resin composition as claimed in claim 1, which gives an injection-molded article that has a total light transmittance, as measured in accordance with JIS K7105 (1981) using a hazemeter and illuminant D65, of 60% or higher.

6. The polycarbonate resin composition as claimed in claim 1, which, when having a thickness of 1 mm, has a total light transmittance as measured in accordance with JIS K7361-1 (1997) of 80% or higher and a haze as measured in accordance with JIS K7105 (1981) of 5% or less.

7. The polycarbonate resin composition as claimed in claim 1, which has a notched Charpy impact strength as measured in accordance with ISO 179 (2000) of 10 kJ/m² or higher.

8. The polycarbonate resin composition as claimed in claim 1, wherein the proportion of the constitutional unit derived from the dihydroxy compound (b) of an aliphatic hydrocarbon based on all constitutional units each derived from a dihydroxy compound in the polycarbonate resin (A) is 45-80% by mole, and
the content of the polycarbonate resin (A) in the polycarbonate resin composition (X) is 1-99% by mass.

9. The polycarbonate resin composition as claimed in claim 1, wherein the dihydroxy compound (a) is a dihydroxy compound represented by the following formula (2):

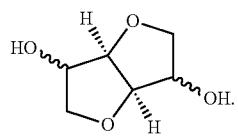

(2)

10. The polycarbonate resin composition as claimed in claim 1, which further contains an ultraviolet absorber in an amount of 0.0001-1 part by weight per 100 parts by weight of the mixture of the polycarbonate resin (A) and the aromatic polycarbonate resin (B).

11. The polycarbonate resin composition as claimed in claim 1, which further contains a hindered amine-based light stabilizer in an amount of 0.001-1 part by weight per 100 parts by weight of the mixture of the polycarbonate resin (A) and the aromatic polycarbonate resin (B).

12. The polycarbonate resin composition as claimed in claim 1, which further contains an antioxidant in an amount of 0.0001-1 part by weight per 100 parts by weight of the mixture of the polycarbonate resin (A) and the aromatic polycarbonate resin (B).

13. The polycarbonate resin composition as claimed in claim 1, which further contains a release agent in an amount of 0.0001-2 parts by weight per 100 parts by weight of the mixture of the polycarbonate resin (A) and the aromatic polycarbonate resin (B).

14. A polycarbonate resin molded object obtained by molding the polycarbonate resin composition according to any one of claims 1, 2 and 3 to 13.

15. The molded object as claimed in claim 14, which has a photoelastic coefficient as measured with light having a wavelength of 600 nm of $7 \times 10^{-11}$ Pa$^{-1}$ or less.

16. A film obtained by molding the polycarbonate resin composition according to any one of claims 1, 2 and 3 to 13.

17. The film as claimed in claim 16 which, when having been molded in a thickness of 0.2 mm, has a total light transmittance as measured in accordance with JIS K7361-1 (1997) of 80% or higher and a haze as measured in accordance with JIS K7105 (1981) of 3% or less.

18. A plate obtained by molding the polycarbonate resin composition according to any one of claims 1, 2 and 3 to 13.

19. An injection-molded article obtained by injection-molding the polycarbonate resin composition according to any one of claims 1, 2 and 3 to 13.

20. The polycarbonate resin composition as claimed in claim 1, which further contains a hindered amine-based light stabilizer in an amount of 0.001-1 part by weight and an antioxidant in an amount of 0.0001-1 part by weight, each per 100 parts by weight of the mixture of the polycarbonate resin (A) and the aromatic polycarbonate resin (B).

21. The polycarbonate resin composition as claimed in claim 1 wherein the amount of the polycarbonate resin (A) is 50 to 99% by weight of the composition.

* * * * *